United States Patent
Garvey et al.

(10) Patent No.: US 11,809,155 B2
(45) Date of Patent: Nov. 7, 2023

(54) MORPHIC MANUFACTURING

(71) Applicant: GRALE TECHNOLOGIES, Youngstown, OH (US)

(72) Inventors: Michael Garvey, Youngstown, OH (US); Fred Persi, Youngstown, OH (US); Matthew Walther, Youngstown, OH (US)

(73) Assignee: GRALE TECHNOLOGIES, Youngstown, OH (US)

( * ) Notice: Subject to any disclaimer, the term of this patent is extended or adjusted under 35 U.S.C. 154(b) by 0 days.

(21) Appl. No.: 17/665,731

(22) Filed: Feb. 7, 2022

(65) Prior Publication Data

US 2022/0155749 A1     May 19, 2022

Related U.S. Application Data

(63) Continuation of application No. 16/861,392, filed on Apr. 29, 2020, now Pat. No. 11,243,507.

(51) Int. Cl.
    *G05B 19/401*     (2006.01)
    *G05B 19/42*     (2006.01)

(52) U.S. Cl.
    CPC ....... *G05B 19/401* (2013.01); *G05B 19/4207* (2013.01); *G05B 2219/37198* (2013.01)

(58) Field of Classification Search
    CPC .............. G05B 19/401; G05B 19/4207; G05B 2219/37198
(Continued)

(56) References Cited

U.S. PATENT DOCUMENTS

| | | |
|---|---|---|
| 2,820,187 A | 1/1958 | Parsons et al. |
| 4,571,149 A | 2/1986 | Soroka et al. |

(Continued)

FOREIGN PATENT DOCUMENTS

WO     WO-2010112217 A1 * 10/2010 ....... G05B 19/40937

OTHER PUBLICATIONS

International Search Report & Written Opinion for PCT Application Serial No. PCT/US2021/027406, dated May 28, 2021, 8 pages.

(Continued)

*Primary Examiner* — Ronald D Hartman, Jr.
(74) *Attorney, Agent, or Firm* — AMIN, TUROCY & WATSON, LLP

(57) ABSTRACT

A manufacturing control system for an additive, subtractive, or hybrid machining system implements a morphic manufacturing approach that integrates in situ inspection and related decision-making into the manufacturing process. After execution of a machining or deposition operation, the system performs a sensor scan to collect sensor measurement data for the resulting part while the part remains in the manufacturing work cell. The measurement data is compared with an as-designed digital model of the part to determine whether further machining or deposition is necessary to bring the finished part into tolerance with the model. If necessary, the system performs another additive and/or subtractive manufacturing operation on the part based on analysis of the measurement data to bring the part into tolerance. The measured inspection data can be stored in association with each manufactured part for auditing purposes or for creation of part-specific digital twins.

25 Claims, 15 Drawing Sheets

(58) Field of Classification Search
USPC .......................................................... 700/159
See application file for complete search history.

(56) References Cited

U.S. PATENT DOCUMENTS

| | | | |
|---|---|---|---|
| 7,970,488 B2 | 6/2011 | Prestidge et al. | |
| 9,222,769 B2 | 12/2015 | Garvey et al. | |
| 9,528,826 B2 | 12/2016 | Garvey et al. | |
| 9,656,429 B1 | 5/2017 | Mantha et al. | |
| 10,295,341 B2 | 5/2019 | Garvey et al. | |
| 11,079,748 B1* | 8/2021 | Garvey | G05B 19/41885 |
| 2004/0107019 A1* | 6/2004 | Keshavmurthy | G05B 19/4097 700/118 |
| 2014/0157610 A1 | 6/2014 | Garvey et al. | |
| 2016/0026751 A1 | 1/2016 | Walther | |
| 2016/0236414 A1 | 8/2016 | Reese et al. | |
| 2018/0126487 A1 | 5/2018 | Chen et al. | |
| 2019/0009472 A1* | 1/2019 | Mark | B33Y 70/00 |
| 2019/0018391 A1* | 1/2019 | Rogers | G05B 19/4097 |
| 2019/0134911 A1 | 5/2019 | Jones et al. | |
| 2019/0178618 A1 | 6/2019 | McMurtry et al. | |
| 2019/0188346 A1 | 6/2019 | Mirabella et al. | |
| 2019/0204813 A1 | 7/2019 | Behandish et al. | |
| 2019/0377317 A1 | 12/2019 | Wilcox et al. | |
| 2020/0030915 A1 | 1/2020 | Uozumi et al. | |
| 2021/0001542 A1 | 1/2021 | Villette | |
| 2021/0034036 A1 | 2/2021 | Nomura et al. | |
| 2021/0069849 A1 | 3/2021 | Matsumura | |
| 2021/0086441 A1* | 3/2021 | Georgeson | B29C 64/393 |
| 2021/0103268 A1 | 4/2021 | Tang et al. | |
| 2021/0141970 A1* | 5/2021 | Xu | G06F 17/18 |

OTHER PUBLICATIONS

Non-Final Office Action for U.S. Appl. No. 16/861,392 dated May 27, 2021.

International Preliminary Report on Patentability for PCT Application Serial No. PCT/US2021/027406, dated Nov. 10, 2022, 5 pages.

* cited by examiner

MORPHIC MANUFACTURING

CROSS-REFERENCE TO RELATED APPLICATIONS

This is a Continuation of application Ser. No. 16/861,392, filed on Apr. 29, 2020, now U.S. Pat. No. 11,243,507, the entire contents of which are incorporated herein by reference.

TECHNICAL FIELD

This disclosure generally relates to industrial manufacturing, and, more specifically, to additive, subtractive, and hybrid manufacturing control systems.

BACKGROUND

Modern manufacturing processes that involve machining of stock material or deposition of material to form finished products, or components of larger assembled products, often employ programmable manufacturing tools in order to achieve automation, product consistency, and precision. For example, in the case of subtractive manufacturing, numerically controlled (NC) systems—which include computer numerically controlled (CNC) machines—are typically used to control one or more machining tools that perform subtractive machining on a unit of stock material to yield a final workpiece or part that conforms to design specifications. In the case of additive manufacturing, a three-dimensional (3D) printer may control an additive disposition head that deposits material in a controlled manner to form a finished part having a defined shape or topology. Hybrid manufacturing systems may employ both additive and subtractive manufacturing processes to yield a finished part.

After performing pre-cycle initialization (which may involve taking measurements of machine stock prior to beginning the manufacturing cycle to initialize coordinates), an additive and/or subtractive manufacturing cycle is performed. Upon completion of the manufacturing cycle, which may involve one or more passes of the tool over the workpiece to remove and/or add stock material, the finished part is typically inspected for defects or deviations from the part design specifications in excess of defined tolerances. If it is found that the part does not conform to design specifications in one or more respects, the part may be rejected or, if further machining or deposition can bring the part into tolerance, placed back into the workstation for further processing. The operator may also perform checks on the machine to determine if adjustments should be made. However, feedback from the inspection process back to the manufacturing process is largely manual and subject to human error.

The above-described is merely intended to provide an overview of some of the challenges facing conventional manufacturing systems. Other challenges with conventional systems and contrasting benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

One or more embodiments of the present disclosure relate to a morphic manufacturing approach that utilizes data capture technology, processing software, and instructions for both additive and subtractive manufacturing. This morphic manufacturing process is designed to perform in situ inspection measurements on the part after an additive (e.g., machining) and/or subtractive (e.g., 3D printing) manufacturing pass has been completed, compare the as-designed part with the as-manufactured part as represented by the measured inspection data, and adjust a subsequent manufacturing pass if necessary to bring the as-manufactured part into alignment with design specifications. This measure-and-adjust process is performed while the part is in situ without removing the part from the manufacturing tool's work envelop.

The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
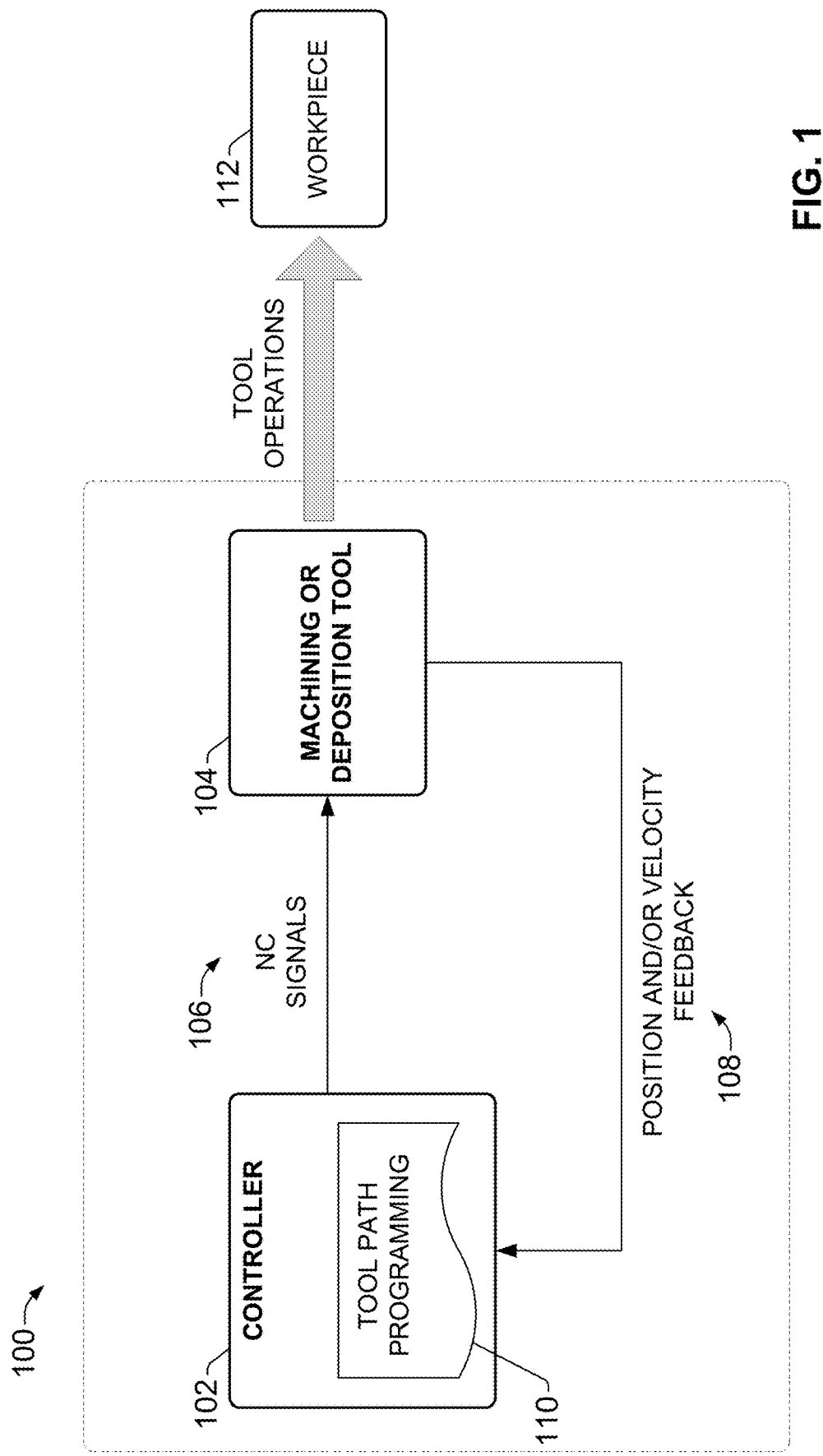
FIG. 1 is a block diagram illustrating a generalized high-level architecture of an example manufacturing machine used to manufacture a workpiece or part using additive and/or subtractive manufacturing methods.

Various embodiments are now described with reference to the drawings, wherein like reference numerals refer to like elements throughout. In the following description, for the purposes of explanation, numerous specific details are set forth in order to provide an understanding of this disclosure. It is to be understood, however, that such embodiments may be practiced without these specific details, or with other methods, components, materials, etc. In other instances, structures and devices are shown in block diagram form to facilitate describing one or more embodiments.

Systems and methods described herein relate generally to the use of a morphic manufacturing approach in which measured as-built data collected for a unit of product is used as feedback into the manufacturing process itself while the product remains in situ in the manufacturing workspace. This morphic manufacturing approach can be implemented in substantially any type of subtractive, additive, or hybrid (additive and subtractive) manufacturing systems, including but not limited to CNC machines (subtractive), 3D printers (additive), or other such manufacturing systems. The as-built data (or inspection data) is fed back to the manufacturing process and used to adjust and optimize the tool path for a subsequent pass of the manufacturing tool to ensure that the part is brought within design tolerances defined by a digital as-designed model of the part.

Although some examples described and illustrated herein discuss the subject morphic manufacturing approach in the context of a CNC machining system and process (a subtractive manufacturing process), it is to be appreciated that the morphic manufacturing approach described herein is also applicable to other types of manufacturing systems, including additive, subtractive, and hybrid systems. For example, in addition to implementation in a CNC machine that controls a machining tool to perform subtractive operations on a unit of stock material, the morphic manufacturing approach described herein can also be implemented in a 3D printing system that controls a disposition head to form a finished part through deposition or addition of material in a controlled manner. The morphic manufacturing approach is also applicable to hybrid manufacturing systems that perform both additive and subtractive processes to form a finished part or workpiece.

FIG. 1 is a block diagram illustrating a generalized high-level architecture of an example manufacturing machine 100 used to manufacture a workpiece or part using additive and/or subtractive manufacturing methods. Manufacturing machine 100 may be, for example, a CNC machine that forms a finished product by performing machining operations on a unit of stock material, or a 3D printer that forms a finished product by controlled deposition of material. A controllable tool 104 operates under the control of a controller 102. In the case of a CNC system or another type of subtractive manufacturing system, tool 104 may be a machining tool, such as a drill, a lathe, a shaper, a mill, or other such machining tool capable of shaping a piece of stock material (e.g., metal, plastic, etc.) using subtractive or machining processes to yield a finished workpiece 112. In the case of a 3D printer or another type of additive manufacturing system, tool 104 may be a deposition head that deposits material in a controlled manner to build the finished workpiece 112. Some tools 104 may be attached to robotic operating arms that can be articulated over multiple independently controllable axes of motion, allowing the tool 104 to be manipulated along a wide range of positions and orientations as the workpiece is held fixed on a bed or other surface within the work area. For example, a five-axis CNC machine may support three linear axes of motion (x-axis, y-axis, and z-axis) and two rotational axes of motion (e.g., a-axis and c-axis). The three-dimensional volume within which the tool can be moved is referred to as the work envelope.

Tool 104 is controlled by a controller 102 in accordance with tool path programming 110 that defines the movements and operations to be carried out by the tool 104 during a machine cycle. Tool path programming 110 defines the movements of respective axes of motion of the tool 104 as well as the timings of these movements. Tool path programming 110 also defines the timings of tooling operations (e.g., machining or deposition operations) to be performed as the tool 104 traverses these defined paths (e.g., drilling operations, cutting operations, etc.). Controller 102 translates these defined movements and operations to NC signals 106 that are delivered to the tool's drive system, causing the tool 104 to carry out the defined movements and operations.

In the illustrated example, controller 102 controls the tool 104 in a closed-loop manner. Position and/or velocity feedback data 108 measured by sensors associated with the tool 104 (e.g., encoders or other such data sources) are fed back to the controller 102, which corrects the movement of the tool 104 if necessary based on calculated deviations between the actual tool position or velocity (as reported by feedback data 108) and the programmed position or velocity to ensure that the tool's movements and operations accord with the programmed path.

Figure 2:
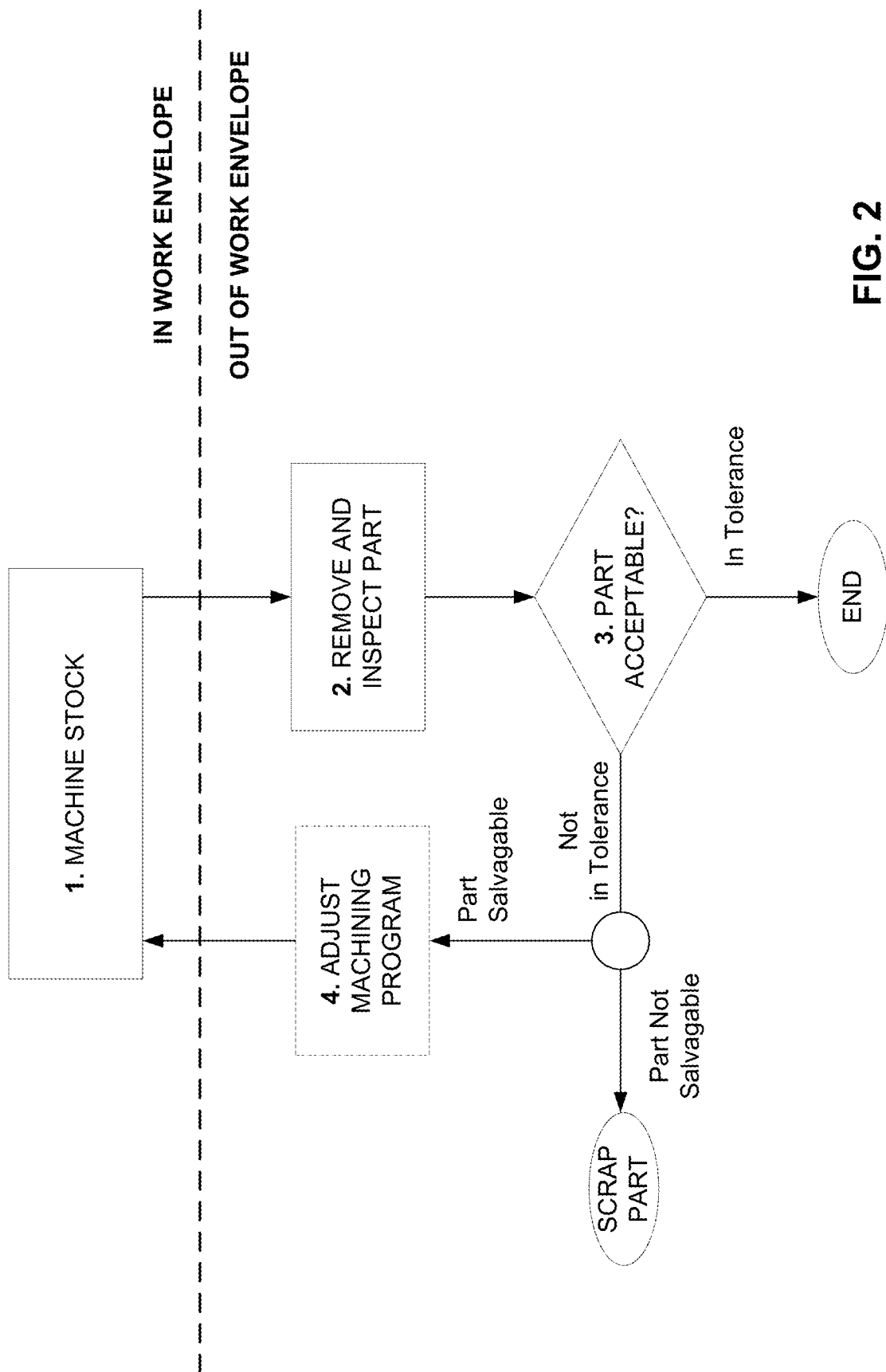
FIG. 2 is a flow diagram illustrating example machining and inspection phases for a machined part.

Upon completion of a manufacturing cycle (which may comprise one or more machining passes of the tool 104 over the stock material, or a complete 3D printing cycle), the finished product or part is removed from the manufacturing work cell and inspected for defects or deviations from the part design in excess of defined tolerances. In some scenarios, an operator may choose to re-work the part to correct specific defects found during the inspection, if such defects are correctable by further tooling passes. However, provision of feedback from the inspection process back to the manufacturing process in this manner is largely manual and subject to human error. FIG. 2 is a flow diagram illustrating example machining and inspection phases for a machined part. Although this example workflow is described in connection with an example CNC machining process, a similar workflow is applicable to 3D printing processes or other additive, subtractive, or hybrid manufacturing processes. Inside a CNC work envelope in which machining takes place, a piece of stock material (e.g., metal, plastic, glass, etc.) is machined by the machining tool 104 (step 1) in accordance with the CNC controller programming. Upon completion of a machining cycle, the resulting machined workpiece or part is removed from the work envelope and inspected at step 2. This inspection may be carried out, for example, at a separate inspection station or laboratory using a touch probe, a coordinate measuring machine (CMM), a laser measurement device, calipers, or another type of measurement or metrology device. The inspection is intended to determine whether the shape, dimensions, surface topology, or other key geometric features of the machined part are within design tolerances. At step 3, a determination is made as to whether the inspection results indicate that the machined part is within design tolerances.

If the machined workpiece is within tolerance, the workpiece is accepted and either added to equipment inventory or moved on to another machine for subsequent processing steps. Alternatively, if the workpiece is not within tolerance, the workpiece may be scrapped if deemed unsalvageable, or may be placed back in the CNC work cell for further machining intended to bring the workpiece within design tolerance if the workpiece is deemed salvageable. This may involve adjusting the machine program or adjusting for tool wear at step 4 based on the degree and nature of the deviation from the as-designed specifications. This manual inspection and feedback process is time-consuming and involves a considerable degree of human intervention, since the workpiece must be measured by the operator, either in situ or by physically removing the workpiece from the machine for inspection and possibly placed back into the machine for further machining.

Moreover, in cases in which a machine cycle comprises multiple passes of the machining tool 104 over the part under production, improper cuts or other machining defects that occur in early machining passes of the cycle (or initial imperfections in the stock material prior to machining) may be more easily corrected before subsequent machining passes are performed later in the cycle. However, since these defects are typically not discovered until all stages of a complete machine cycle have been performed, the opportunity to correct these machining defects earlier in the machining cycle is missed. Defects incurred early in the machining cycle may also be cascaded to the final machined part if subsequent machine passes are permitted to execute without first correcting the earlier defects.

To address these and other issues, one or more embodiments described herein implement a morphic manufacturing approach that integrates inspection and related decision-making into the manufacturing equipment. In one or more embodiments, a manufacturing system (e.g., a CNC system, a 3D printer, or another type of subtractive, additive, or hybrid machining system) implements a manufacturing process that incorporates three-dimensional (3D) imaging measurement (e.g., geometric sensing or another type of metrological sensing) and dynamic inspection feedback into the manufacturing cycle as a part is being fabricated. This provides real-time feedback during fabrication of the part that ensures the finished part meets the dimensional and geometric requirements of the part design. By integrating part inspection and associated decision-making and feedback into the manufacturing process, embodiments of the manufacturing control system described herein can improve manufacturing accuracy and reduce the number of rejected parts. This approach can also significantly reduce inspection time and labor by eliminating the need to remove the part for inspection and reload the part into the work cell if corrections are necessary, or to automate manual processes. Since the inspection of a workpiece is substantially automated, this approach can also improve repeatability and consistency of inspection data between parts.

In some embodiments, the sensor that performs the in situ inspection can be attached to the same spindle or operating arm as the machining or deposition tool, allowing the sensor to be maneuvered using the same articulating mechanism as the tool. This can ensure that a common coordinate system is used as the frame of reference for both inspection data and tooling data without the need for separate reconciliation processing to align one set of data to the coordinate system of the other data set.

In various embodiments, the inspection and feedback processing can be performed at different stages of the manufacturing cycle depending on the application. For example, in some scenarios an interim inspection can be performed on the workpiece after each stage of a multi-stage manufacturing cycle, and results of these inspections can be used to adjust the tooling path of subsequent tooling passes (e.g., by modifying cutting depths of selected surfaces). In this way, part defects that are incurred early in the manufacturing cycle can be accounted for in subsequent tooling passes rather than delaying discovery of the defect until after a complete manufacturing cycle has finished. In other scenarios, inspections may be performed only upon completion of a full manufacturing cycle (comprising one or more passes of the tool), and the control system uses the inspection results to generate corrective tooling instructions for a subsequent manufacturing cycle, if necessary, to correct discovered defects before allowing the part to be accepted.

Figure 3:
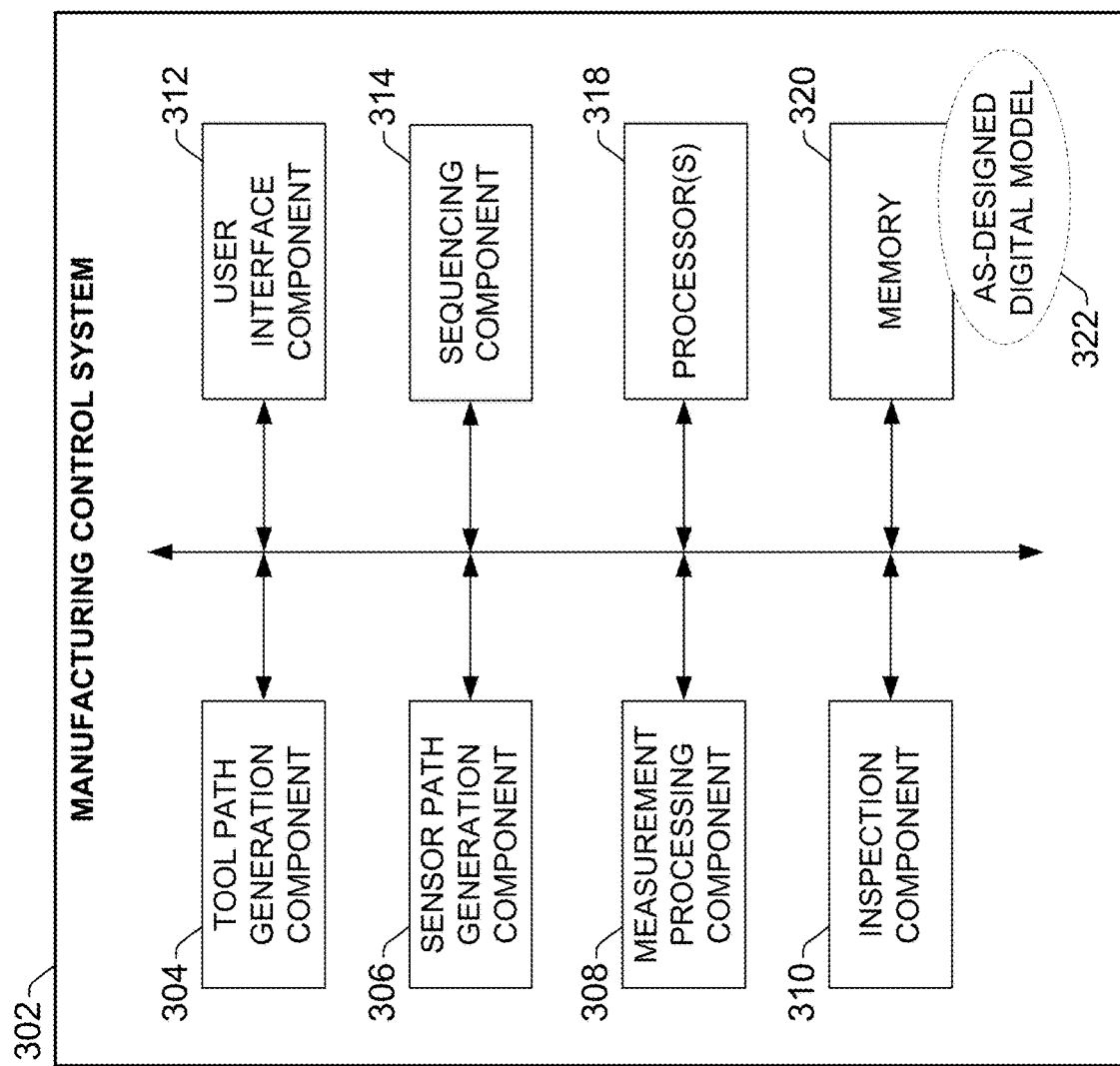
FIG. 3 is a block diagram of an example machining control system capable of performing in situ inspections of a machined part and providing the inspection results as feedback to the manufacturing process.

FIG. 3 is a block diagram of an example manufacturing control system 302 capable of performing in situ inspections of a machined part and providing the inspection results as feedback to the manufacturing process. System 302 may be a control system for substantially any type of additive, subtractive, or hybrid (additive and subtractive) manufacturing system, including but not limited to a CNC machine, a 3D printer, or other such systems. Manufacturing control system 302 can include a tool path generation component 304, a sensor path generation component 306, a measurement processing component 308, an inspection component 310, a user interface component 312, a sequencing component 314, one or more processors 318, and memory 320. In various embodiments, one or more of the tool path generation component 304, sensor path generation component 306, measurement processing component 308, inspection component 310, user interface component 312, sequencing component 314, the one or more processors 318, and memory 320 can be electrically and/or communicatively coupled to one another to perform one or more of the functions of the manufacturing control system 302. In some embodiments, components 304, 306, 308, 310, 312, and 314 can comprise software instructions stored on memory 320 and executed by processor(s) 318. Manufacturing control system 302 may also interact with other hardware and/or software components not depicted in FIG. 3. For example, processor(s) 318 may interact with one or more external user interface device, such as a keyboard, a mouse, a display monitor, a touchscreen, or other such interface devices.

Tool path generation component 304 can be configured to determine a tool path (or a sequence of tool paths) capable of converting a unit of stock material into a finished part or workpiece (in the case of subtractive manufacturing) or depositing material in a manner that builds the finished part or workpiece (in the case of additive manufacturing) in accordance with an as-designed digital model 322 of the part, and generate corresponding tooling instructions (e.g., NC instructions) designed to drive a tool through the prescribed tool path. The digital model 322 can be, for example, a computer-aided design (CAD) model that defines the desired final geometry of the part. In various embodiments, the tool path may be at least partially defined by a user using suitable CAM software, or may be generated by the tool path generation component 304 based on analysis of the digital model 322 in view of the tool's motion capabilities. Tool path generation component 304 can also determine the suitable tool path using simulation techniques in some embodiments. The instructions generated by tool path generation component 304 can be directed to the drive system of a subtractive, additive, or hybrid machine under control of the system 302.

Sensor path generation component 306 can be configured to determine a suitable scan path of a metrology sensor for collecting inspection data for the processed part while the part is still in the manufacturing work envelope after a tooling cycle has been performed (that is, without removing the part from the work cell), and to generate suitable sensor path instructions (e.g., NC instructions) for driving the sensor tool through the scan path. The sensor scan path is typically defined separately from the tool path. As with the tool path, sensor path generation component 306 can be configured to allow a machine programmer to design the sensor path, or may be configured to infer or otherwise generate a suitable sensor path based on the digital model 322. Sensor path generation component 306 may also determine a suitable sensor path using simulation techniques in some embodiments. Embodiments of manufacturing control system 302 in which the sensor is a fixed inspection device that collects data for the part without traversing a scan path (e.g., a high speed camera, a vision camera, a depth camera, or another sensor device having a fixed location) may omit the sensor path generation component 306.

Measurement processing component 308 can be configured to apply compensation processing to measurement data (e.g., 3D imaging data) received from the metrology sensor to account for sensor calibration and, if necessary, to place the measurement data in the same coordinate system as the as-designed digital model 322. The inspection component 310 can be configured to compare the corrected measurement data with the as-designed digital model 322 to determine whether the processed part satisfies design tolerances, or alternatively if the tool should execute another machining or deposition operation to bring the part into tolerance. If the inspection results indicate that the part should be re-processed to bring the part within design tolerances, or that the next planned tool path should be modified to compensate for a detected defect, the tool path generation component 304 can modify the tool path for the subsequent machining pass, if necessary, based on results of the in situ inspection.

The user interface component 312 can be configured to receive user input and to render output to the user in any suitable format (e.g., visual, audio, tactile, etc.). User input can be, for example, as-designed digital model information, tool path or sensor path programming, indications of user acceptance of a recommended tool path modification, or other such inputs. Output generated by the user interface component 312 can include part inspection or report information, sensor measurement information, prompts requesting approval of a proposed tool path modification, or other such output data.

Sequencing component 314 can be configured to control the timing of execution of the tooling path instructions and the sensor path generation instructions, such that the sensor path instructions are executed upon completion of a tooling cycle to facilitate collection of inspection data for the processed part, and modified tooling path instructions are executed in response to determining that the processed part is not within tolerance of the digital model 322 based on analysis of the inspection data.

The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

Figure 4:
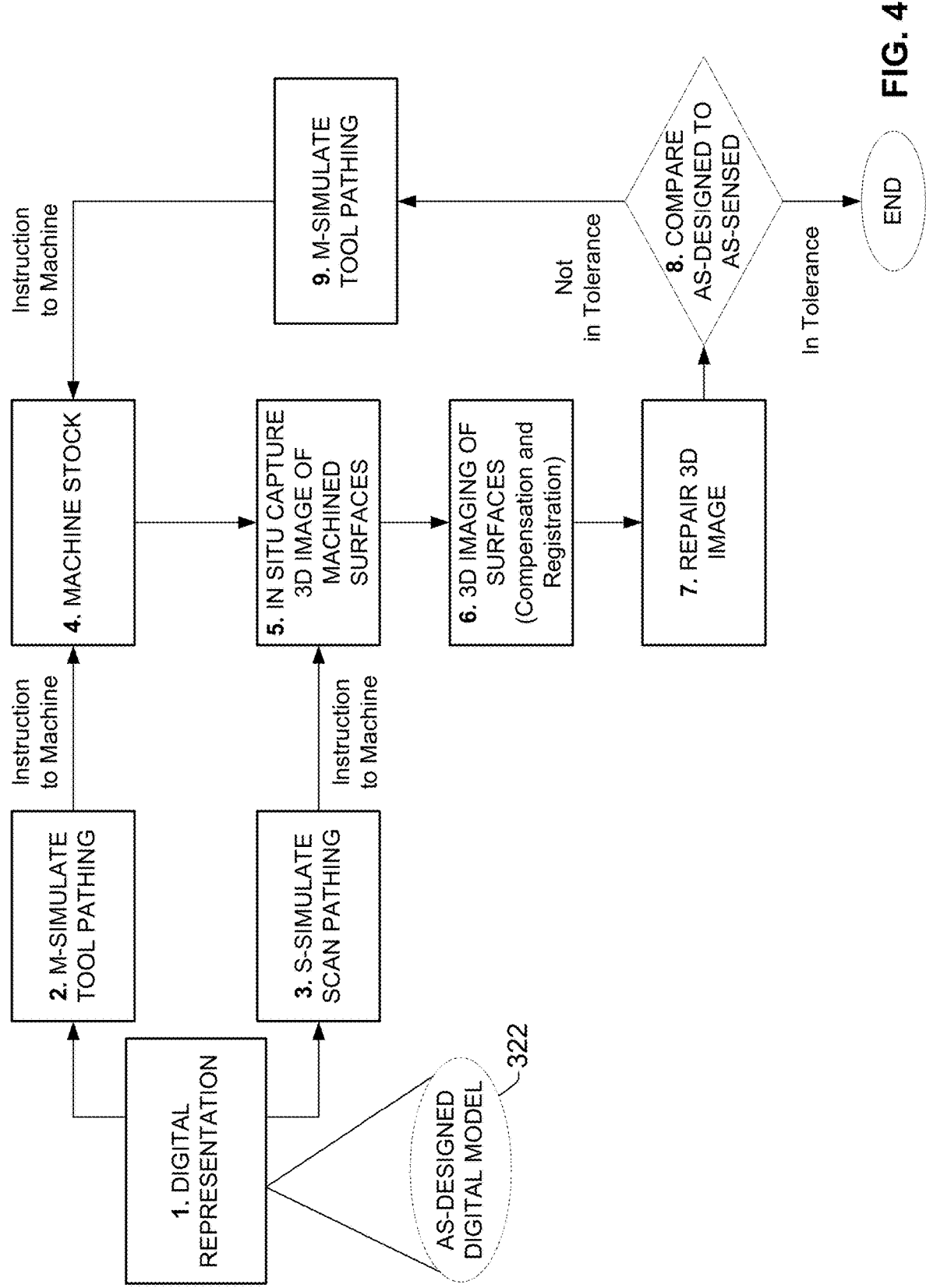
FIG. 4 is a flow diagram illustrating an integrated process of NC instruction, in situ inspection, decision-making, and feedback that can be implemented by one or more embodiments of the manufacturing system described herein.

FIG. 4 is a flow diagram illustrating an integrated process of NC instruction, in situ inspection, decision-making, and feedback that can be implemented by embodiments of manufacturing control system 302. In contrast to the process flow depicted in FIG. 2, the morphic manufacturing process depicted in FIG. 4 can be performed without removing the part under production from the manufacturing work envelope, with in situ inspection results being fed back into the manufacturing process to ensure that the part geometry converges to as-designed specifications (in the case of Model Based Definition (MBD) integrated systems). Although the flow diagram depicted in FIG. 4, as well as subsequent example systems and methods described herein, are discussed in connection with an example subtractive machining system and process (e.g., a CNC machine), it is to be understood that the morphic manufacturing workflow discussed in these examples are also applicable to additive manufacturing systems (e.g., 3D printing systems), as well as hybrid manufacturing systems that employ both additive and subtractive manufacturing cycles.

At step 1 (Digital Representation), an as-designed digital model 322 is created and stored on the manufacturing control system 302 (e.g., in memory 320). As-designed digital model 322 is a digital representation (e.g., a three-dimensional CAD model or another type of digital representation) that defines the desired final geometry of the part to be shaped by a machining tool under control of the manufacturing control system 302. Digital model 322 can define the as-designed dimensions and/or three-dimensional surface topologies of the finished part, including surface depths; curvatures; locations and dimensions of features such as holes, corners, or pockets; or other such geometric properties. This model 322 is the basis for subsequent steps in the process.

Figure 5:
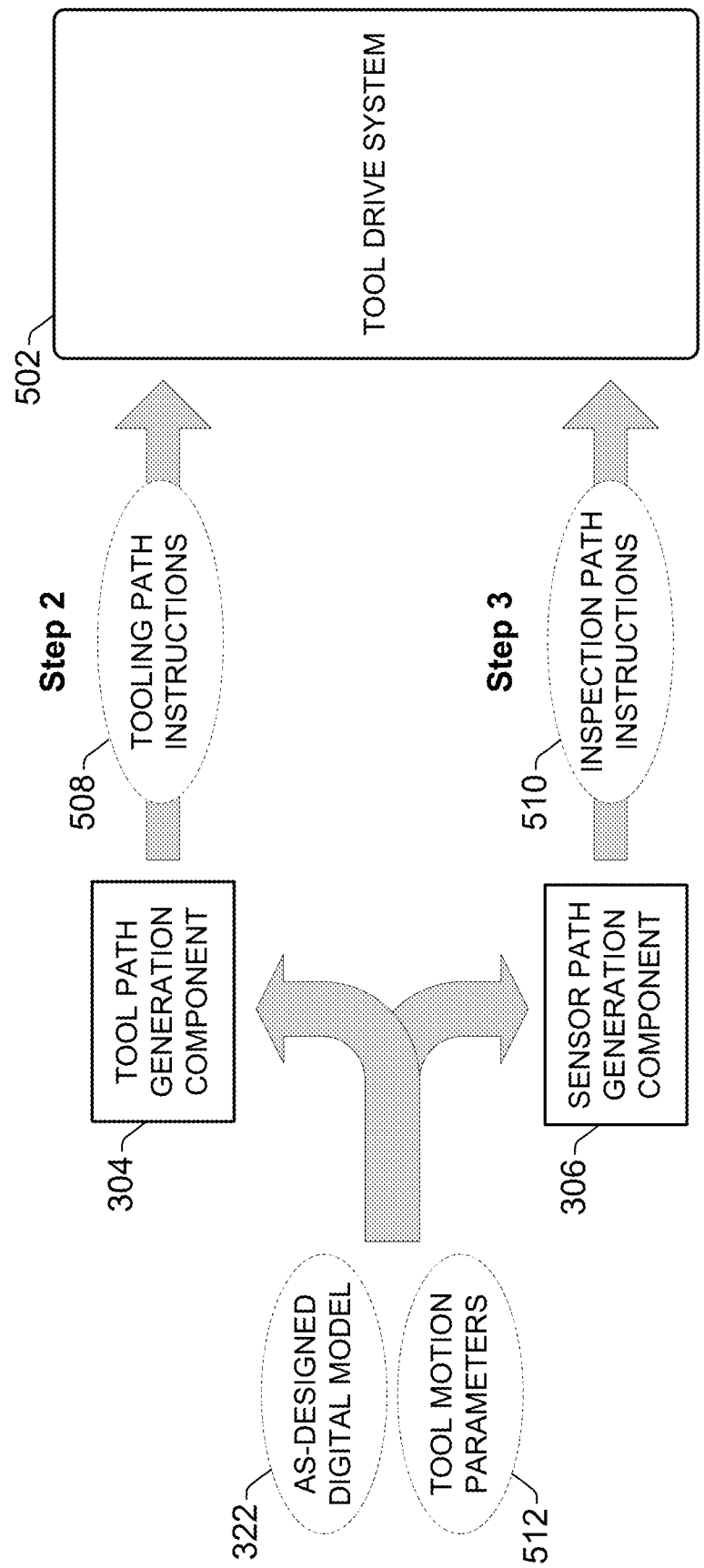
FIG. 5 is a diagram illustrating translation of an as-designed digital model to a set of tooling path instructions by a tool path generation component.

At step 2 (M-Simulate Tool Pathing), the tool path generation component 304 determines and generates suitable NC instructions for controlling the associated machining tool (e.g., drill, lathe, shaper, mill, etc.) to convert a piece of stock material into an idealized finished part in accordance with the as-designed digital model 322. In some embodiments, these NC instructions can be at least partially programmed by a machine programmer using suitable programming tools. The instructions may also be at least partially inferred or generated by the programming tools or by the manufacturing control system 302 itself based on the digital model 322. FIG. 5 is a diagram illustrating translation of an as-designed digital model 322 to a set of tooling path instructions 508 by the tool path generation component 304 according to one or more embodiments. Tool path generation component 304 can analyze the part topology and shape information defined by the digital model 322 together with the motion parameters of the machining tool controlled by the manufacturing control system 302 to determine one or more suitable machining paths to be traversed by the machining tool in order to convert a piece of stock material to a finished part conforming to the digital model 322. To this end, tool path generation component 304 can reference, as inputs, the known motion parameters 512 of the machining tool, including but not limited to the machining tool's axes of motion and the ranges of motion of each axis (e.g., the machine's work envelope). Based on this information, tool path generation component 304 can generate tooling path instructions 508 defining suitable machining paths—within the tool's defined limits of motion—that are estimated to yield a finished part or workpiece conforming to the design parameters defined in the digital model 322. These tooling path instructions 508 can be executed by the tool drive system 502, which maneuvers the machining tool in accordance with the instructions 508.

Figure 6:
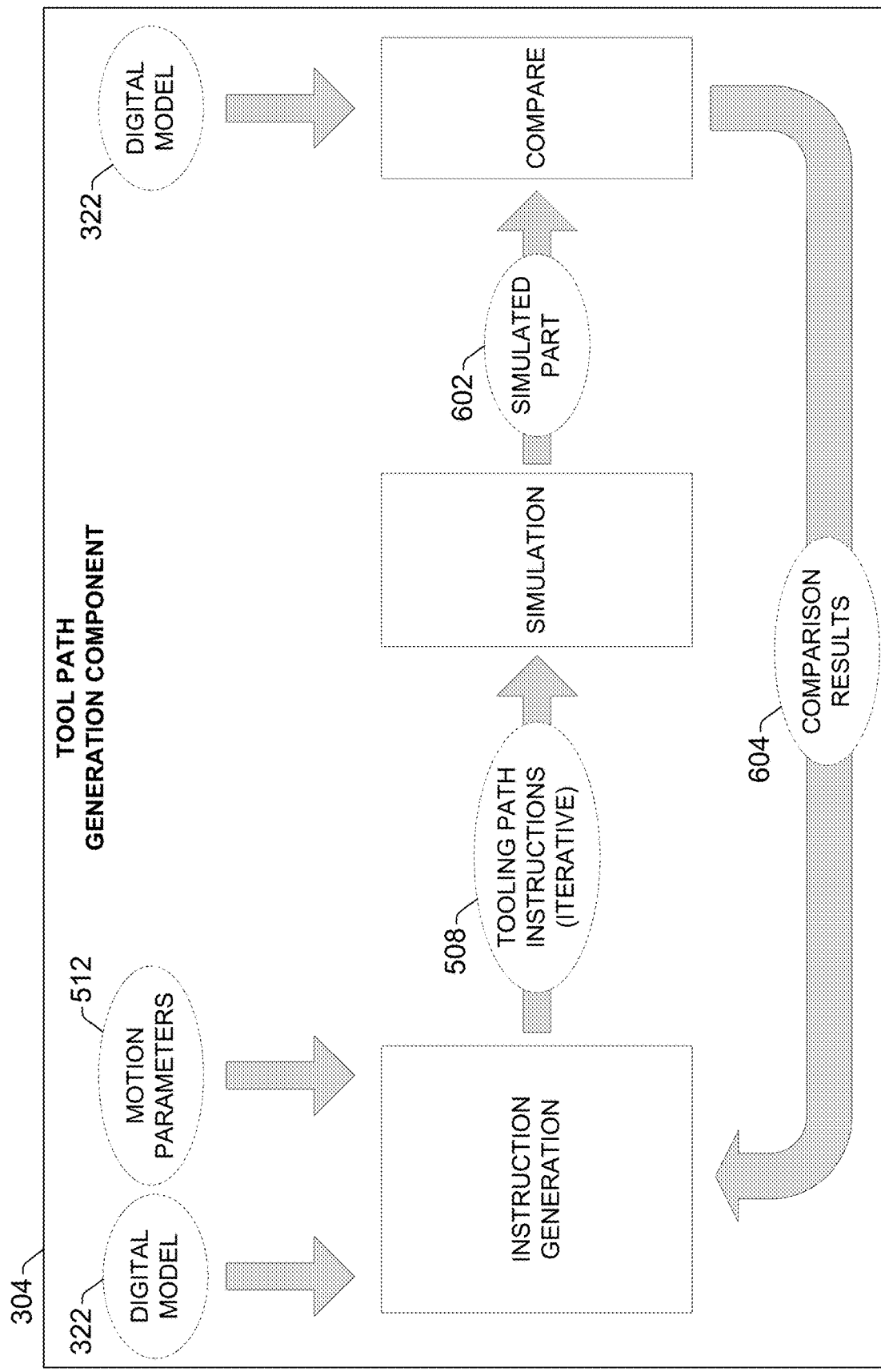
FIG. 6 is a diagram illustrating a generalized simulation processing that can be implemented by embodiments of a tool path generation component that support simulation.

In some embodiments, tool path generation component 304 can determine the suitable machining tool paths and corresponding tooling path instructions 508 using simulation techniques. FIG. 6 is a diagram illustrating a generalized simulation processing that can be implemented by embodiments of tool path generation component 304 that support simulation. In this example, tool path generation component 304 may generate an initial set of tooling path instructions 508 based on the as-designed digital model 322 and the motion parameters 512 of the machining tool, and execute a simulation on this initial set of tooling path instructions 508. This simulation yields a simulated part model 602 that digitally represents a manufactured part that would result if the set of tooling path instructions 508 were executed by the machining tool on a piece of stock material.

The part model 602 is then compared with the as-designed digital model 322 to determine a degree of fidelity between the simulated part model 602 and the digital model 322. This comparison can identify areas of the simulated part having shapes, contours, or dimensions that deviate, in excess of defined tolerances, from corresponding features of the digital model 322. Results 604 of this comparison are used to modify the initial set of tooling path instructions 508 in a manner estimated to correct the deviations between the simulated part model 602 and the digital model 322. The resulting modified tooling path instructions 508 are then simulated to yield an updated simulated part model 602, which is again compared with the digital model 322. This process is iterated until the simulated part model 602 satisfies defined fidelity criteria relative to the digital model 322, and the finalized set of tooling path instructions 508 that gave rise to the acceptable simulated plant model 602 are output by the tool path generation component 304. This simulation technique is only intended to be exemplary, and it is to be appreciated that any suitable simulation technique capable of generating a set of tooling path instructions 508 for machining or depositing of material according to an as-designed digital model 322 are within the scope of one or more embodiments of this disclosure.

In some embodiments, the techniques described above for generating tooling path instructions 508 may be carried out on a separate machine programming rather than being performed by the tool path generation component 304. In such embodiment, the tooling path instructions 508 can be developed offline and installed on the manufacturing control system 302 for execution.

Returning now to FIG. 4, at step 3 of the sequence (S-Simulate Scan Pathing), the sensor path generation component 306 determines and generates suitable NC instructions for controlling a path of motion of a metrology sensor to perform an automated inspection scan of the part while the part is still in the machining area. Step 3 may be executed in parallel with step 2 in some embodiments. As with the tool path developed at step 2, the sensor path may be at least partially programmed by a machine programmer, or may be at least partially generated automatically by the sensor path generation component 306. Since the sensor path is typically distinct from the manufacturing tool paths, the tool path generation component 304 and the sensor path generation component 306 generate respective distinct sets of instructions 508 and 510 for maneuvering the machining tool and the metrology sensor, as illustrated in FIG. 5.

In some embodiments, the sensor may be attached to the same spindle, or otherwise attached to the same articulating mechanism (e.g., robotic operating arm or another articulating structure) as the machining tool. In this configuration, sensor path generation component 306 can reference the same tool motion parameters 512 when generating a suitable inspection path, since the ranges of motion defined by these parameters will be the same for both the tool and the sensor. Since the sensor and the tool are manipulated by the same articulating structure in this scenario, the tooling path instructions 508 and the inspection path instructions 510 are both sent to the tool drive system 502 for execution during respective tooling and inspection phases The metrology sensor can be substantially any type of movable sensor capable of collecting measurement data from the machined workpiece while the workpiece is still in the machining work cell for the purpose of confirming conformance to design specifications. In various implementations, the metrology sensor may be a touch probe, a laser-based or ultrasound-based distance measurement device, an optical sensor, a surface flaw detector (e.g., an eddy current flaw detector), a contact dimensional instrument (e.g., a linear variable differential transformer), an alloy analyzer (e.g., an x-ray fluorescence analyzer), or another type of sensing device capable of measuring physical characteristics (e.g., surface topologies, edge features, etc.) of the machined workpiece.

In some embodiments, instead of an articulating sensor that collects inspection data from the workpiece by scanning across the workpiece according to a defined sensor path, a fixed sensor may be used to obtain the inspection data. Such fixed sensors may include, for example, high-speed cameras, 3D cameras (e.g., time-of-flight cameras), vision cameras, or other types of sensors capable of collecting inspection data. In such configurations, step 3 of the process flow depicted in FIG. 4 may be omitted without departing from the scope of this disclosure.

Figure 7:
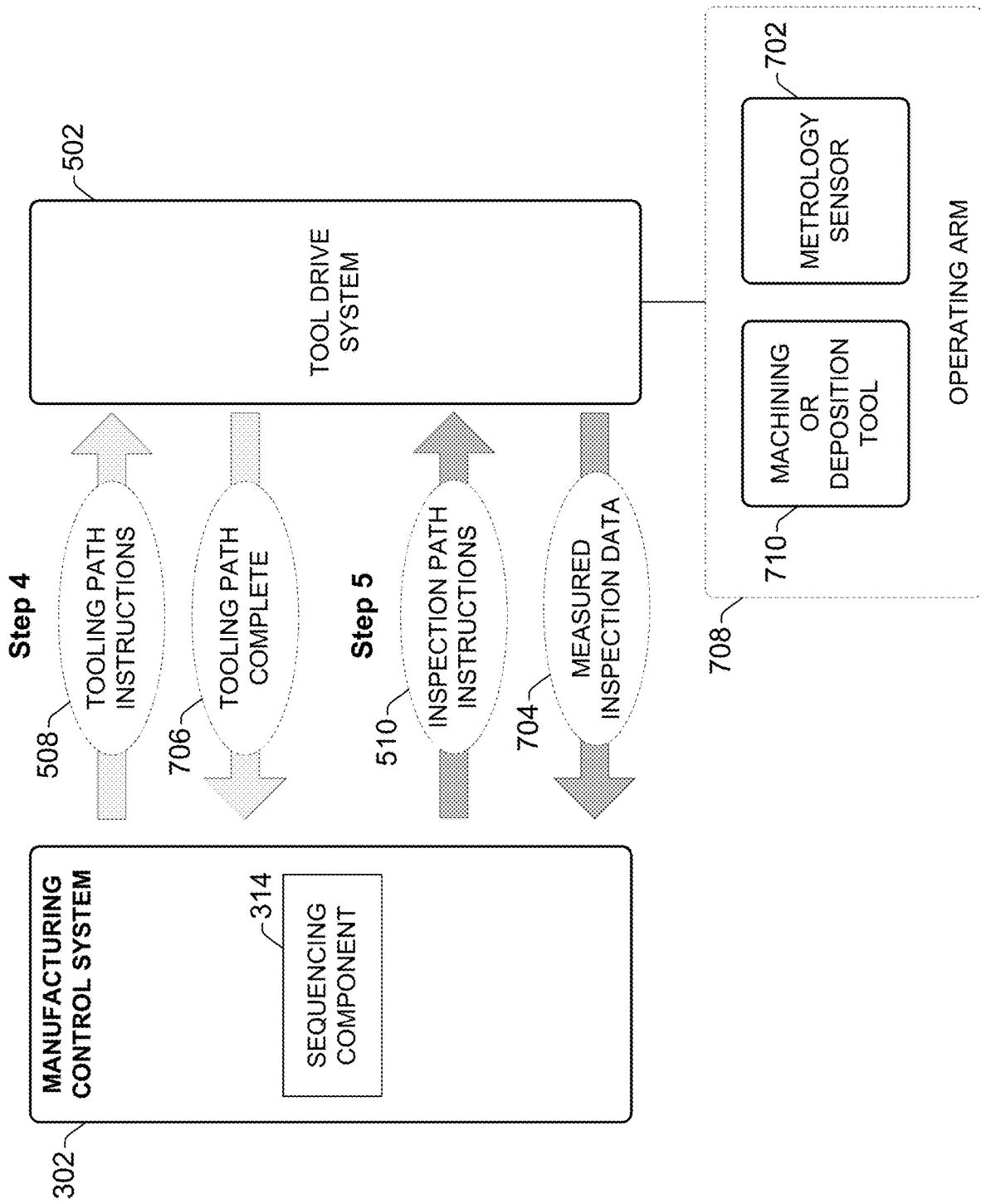
FIG. 7 is a diagram illustrating an example sequencing of tooling and inspection as controlled by a sequencing component.

Returning again to FIG. 4, once the tooling path instructions 508 and the inspection path instructions 510 have been generated, a machining and inspection sequence—represented by steps 4-9—is executed on a unit of stock material under the control of sequencing component 314. FIG. 7 is a diagram illustrating an example sequencing of steps 4 and 5 as controlled by the sequencing component 314. First, a unit of stock material is machined at step 4 (Machine Stock). During this step, sequencing component 314 instructs control system 302 to send the tooling path instructions 508 to the tool drive system 502, or to otherwise initiate execution of tooling path instructions 508 by the tool drive system 502. The drive system then executes the tooling path instructions 508 to guide the machining or deposition tool 710 along the prescribed tooling path and to execute predefined tooling operations (e.g., drilling, cutting, lathing, etc.) at selected stages during the tool's motion. In some applications, the stock material may be held fixed on a platform or bed as the tool 710 traverses the tooling path and performs its machining operations on the material. In other applications, such as lathe operations, the stock material may be rotated within the machining cell as the machining tool traverses its path over the material. In the case of additive machines (e.g., 3D printers) or hybrid machines, the tooling path may also build up portions of the workpiece by selective addition or deposition of material.

Execution of the tooling path instructions 508 transforms the unit of stock material to a machined part or workpiece having machined or built surfaces that at least approximate the desired final workpiece geometry defined by the as-designed digital model 322. After the machining tool has completed traversal of the prescribed tooling path defined by the tooling path instructions 508, drive system 502 generates a "tooling path complete" indication 706 to signal that the tooling path instructions 508 have completed execution. In response to receiving this indication 706, sequencing component 314 initiates step 5 (In Situ Capture 3D Image of Machined Surfaces). During this step, manufacturing control system 302 instructs the tool drive system 502 to execute the inspection path instructions 510 generated by the sensor path generation component 306. Execution of the inspection path instructions 510 by the tool drive system 502 causes the metrology sensor 702 to be moved along the prescribed sensor path over the part.

In the example depicted in FIG. 7 it is assumed that the tool 710 and metrology sensor 702 are attached to the same operating arm 708, such that part inspection is accomplished by programmatically moving the sensor 702 using the same articulating mechanism (though via a different path of movement). This configuration can facilitate collection of the inspection data in the same coordinate system as that of the digital model 322, eliminating uncertainty introduced by the data alignment process that would otherwise be required if the part is inspected in a separate inspection station. This approach can also eliminate the need for a skilled technician to inspect the part, reduce the downtime required to transfer the part to a separate inspection station, and improve consistency of the inspection process and results.

The sensor 702 performs a measurement scan of the part during traversal along the sensor path and collects measured inspection data 704 for the manufactured part based on the measurement. For example, if the sensor 702 is a distance measurement device, the sensor may emit a signal (e.g., a laser signal, an ultrasound signal, etc.) toward the part's surface during traversal along the scan path, and measure the return signal reflected from the part's surface to yield distance information for respective points along the scan path. The manufacturing control system 302 can synchronize the distance values obtained from the sensor 702 with positions and/or orientations of the sensor at the time the respective measurement values were obtained so that the distance values are correctly mapped to their corresponding points on the part surface. This measurement technique is only intended to be exemplary, and it is to be appreciated that other types of sensors and measurement techniques are also within the scope of one or more embodiments of this disclosure. In some embodiments, the measured inspection data 704 obtained by the sensor 702 may collectively yield a 3D image, a point cloud, a 3D faceted model, or another type of 3D representation of the part's surfaces that can be compared with the as-designed surface topologies defined by digital model 322.

Figure 8:
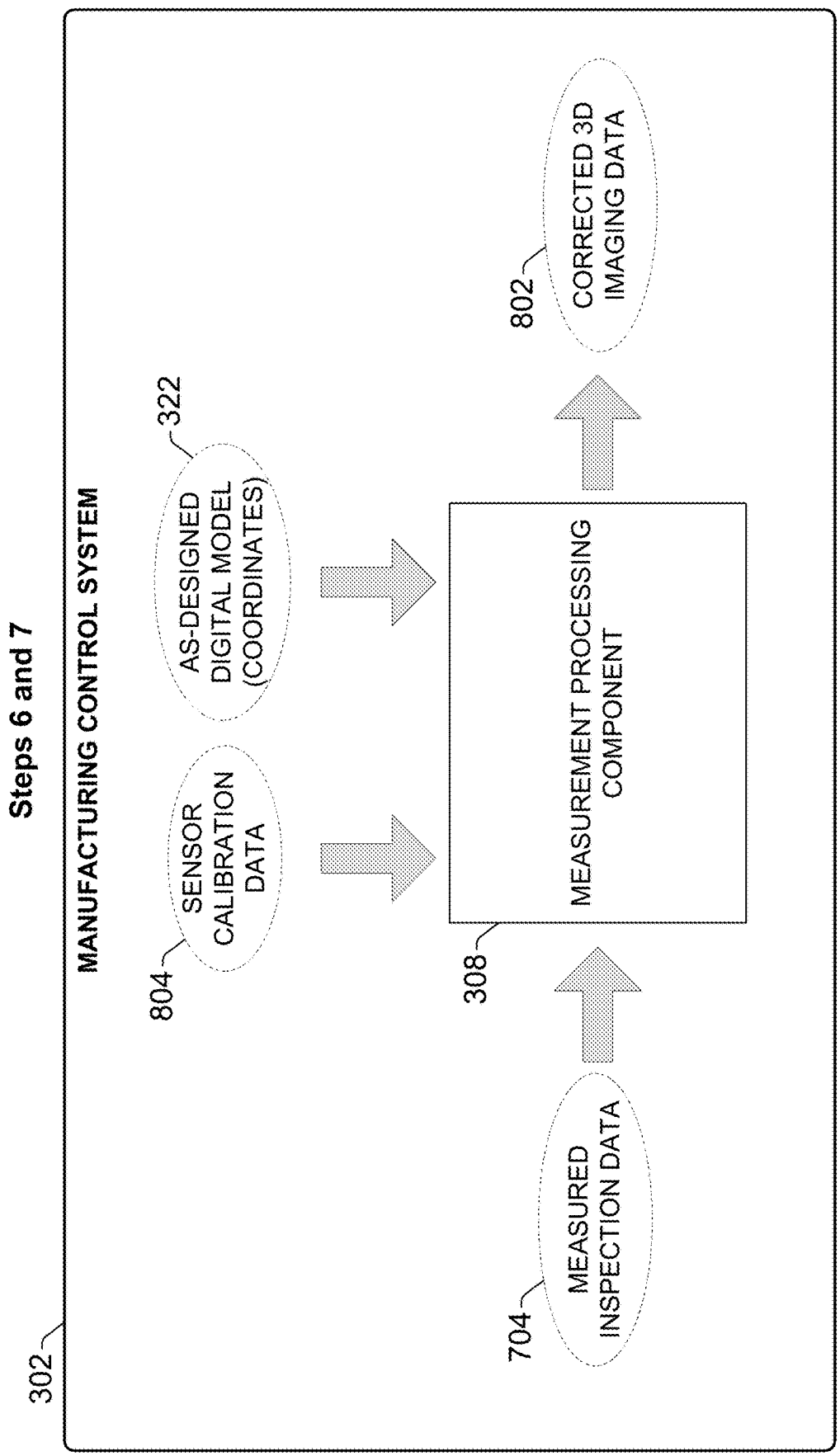
FIG. 8 is a block diagram illustrating an example data flow for image compensation processing.

After the metrology sensor 702 has completed its inspection scan and the resulting measured inspection data 704 has been captured, the manufacturing control system 302 performs step 6 of the process flow (3D Imaging of Surfaces) by applying compensation processing on the measured inspection data 704. FIG. 8 is a block diagram illustrating an example data flow for image compensation processing. During this step, the measurement processing component 308 applies compensation processing to the measured inspection data 704 collected during step 5 to compensate for sensor calibration. To compensate for sensor calibration, manufacturing control system 302 can be provided with sensor calibration data 804 that identifies calibration adjustments made to the metrology sensor 702 (e.g., scale factors, weight values, etc.). Such calibration adjustments are typically performed prior to normal operation. For example, during an initial calibration phase prior to normal manufacturing operation, raw sensor data can be aligned to the coordinates of the operating arm through a Euclidean transform having n degrees of freedom, where n corresponds to the number of axes of motion for the arm (e.g., three rotations and three translations in the case of an example machine with six degrees of freedom). Each of the degrees of freedom can be calibrated by either performing a mechanical adjustment that zeros the discrepancy between the ideal and the actual sensor values, or measuring and recording the discrepancy and applying a suitable correction factor to the raw sensor data that compensates for the discrepancy. Sensor calibration data 804 can include these correction factors, and measurement processing component 308 can apply this sensor calibration data 804 to the measured inspection data 704 during step 6.

Measurement processing component 308 can also, if necessary, transform the measured inspection data 704 such that the three-dimensional coordinate system of the inspection data 704 is aligned to the coordinate system of the as-designed digital model 322. That is, the inspection data 704 is transformed such that the values making up the inspection data 704 relate to the coordinate system of the digital model 322. Aligning the coordinate systems of the measured inspection data 704 and the digital model 322 in this manner allows the inspection data 704 to be accurately mapped to and compared with the digital model 322 for the purpose of identifying deviations of the measured part surface from the as-designed surface.

Alignment of the coordinate systems can be simplified in embodiments in which the sensor 702 is attached to the same operating arm as the machining tool. In conventional machining approaches, if a manufactured part is removed from a work cell and inspected out-of-process (e.g., at a separate inspection station or laboratory), the resulting measurement data—which may be, for example, point cloud data or 3D image data representing the part's surface—will typically be generated using a different coordinate system from that of the digital model 322 of the idealized part. This necessitates reconciliation processing to place the measurement data in the same coordinate system as the digital model 322 (which may be the coordinate system used by the machine as the frame of reference for the manufacturing side). This process is both laborious and subject to inaccuracies. For example, some reconciliation approaches involve the use of fitting algorithms designed to find a best fit between the measurement data and the digital model 322, and these fitting algorithms may produce inaccurate results due to alignment error between the measurement data and the digital model 322. By contrast, if the sensor 702 is configured to perform part inspections within the work cell using the same operating arm 708 as the tool 710, the sensor 702 can be initially calibrated to the coordinate system of the digital model 322 so that the measured inspection data 704 is generated in the same coordinate system as the digital model 322, eliminating the need to subsequently align the inspection data 704 to the coordinate system of the digital model 322.

Measurement processing component 308 can also carry out step 7 of the process flow (Repair 3D Image), whereby modeling imperfections present in the measured inspection data 704 are identified and repaired. These imperfections can include, for example, degenerate facets, folded edges, self-intersections, inconsistent normal, or laminar slits.

Figure 9:
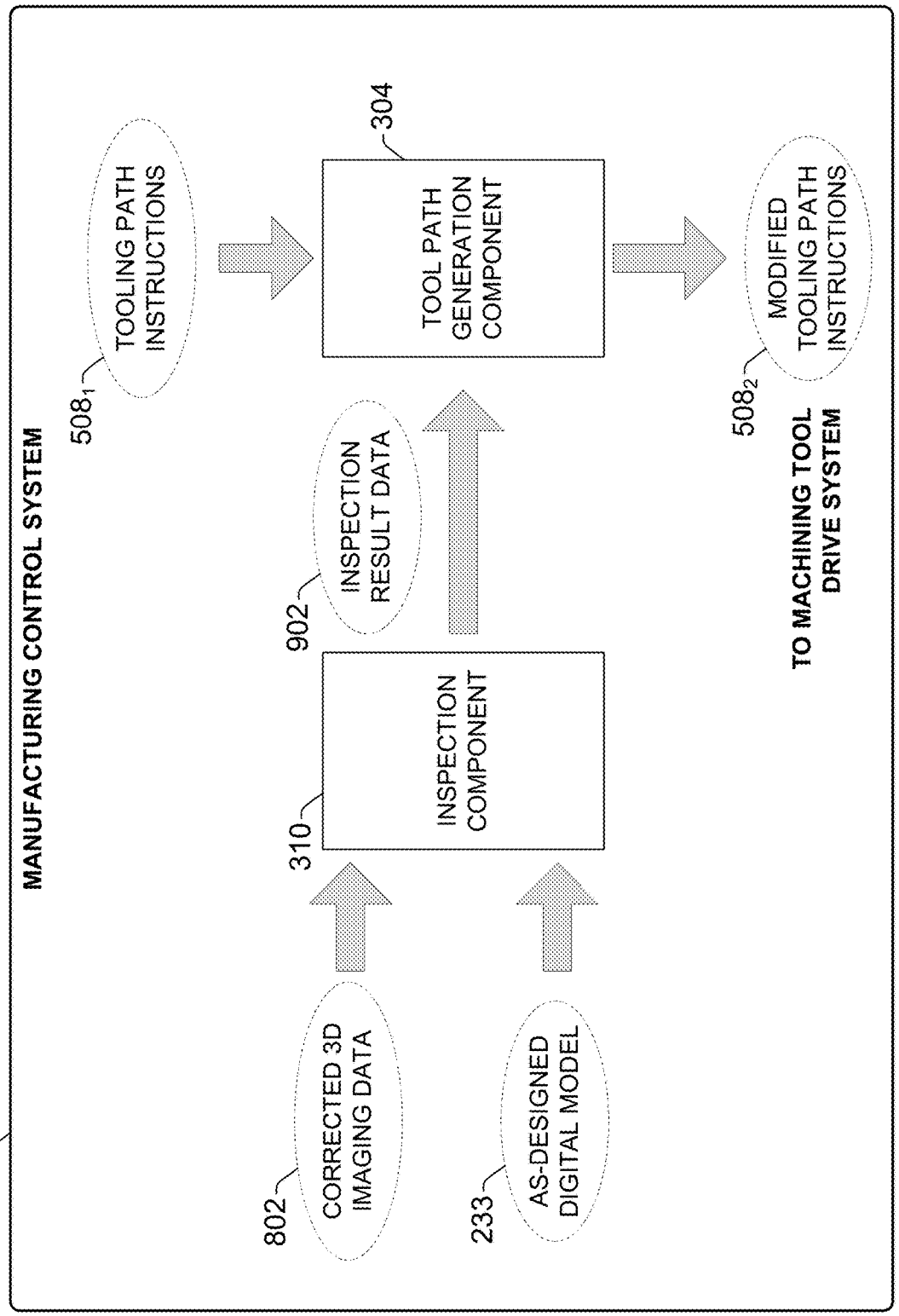
FIG. 9 is a block diagram illustrating modification of tooling path instructions based on a result of a comparison between corrected three-dimensional (3D) imaging data collected for a part and an as-designed digital model of the part.

The processing applied by the measurement processing component 308 on the measured 3D model of the manufactured part transforms the measured inspection data 704 to corrected 3D imaging data 802, which is the modeled representation of the as-built manufactured part to be used in step 8 of the process flow (Compare As-Designed to As-Sensed). FIG. 9 is a block diagram illustrating this step. After the measured inspection data 704 has been processed by the measurement processing component 308 as described above, the inspection component 310 compares the resulting corrected 3D imaging data 802 with the as-designed digital model 322. In general, the inspection component 310 determines a degree to which the geometry modeled by the corrected 3D imaging data 802—representing the measured surface topology of the manufactured part under production—conforms to the desired geometry modeled by the as-designed digital model 322. In this regard, the digital model 322 may define acceptable tolerances for respective different surfaces and features, and inspection component 310 can analyze corrected 3D image data to determine whether the geometries or dimensions of each surface represented by the imaging data 802 are within their defined tolerances.

In some embodiments, inspection component 310 can be trained to compare specific selected features modeled by the corrected 3D imaging data 802 with the corresponding features of digital model 322. For example, the inspection component 310 may be trained to examine the depth of a crucial cut made in the stock material by the tool 710 to ascertain whether the depth is within a defined tolerance of the as-designed depth defined by digital model 322. Other part characteristics that can be examined by the inspection component 310 can include, but are not limited to, surface topologies; hole locations and sizes, pocket locations, sizes, and depths; edge locations and angles; or other such geometric characteristics.

Inspection component 310 generates inspection result data 902 based on the comparison between the corrected 3D imaging data 802 and the as-designed digital model 322. Inspection result data 902 quantitatively characterizes any critical geometric deviations between the corrected 3D imaging data 802 and the digital model 322 discovered by the inspection component 310. For example, inspection result data 902 may identify modeled surfaces of the corrected 3D imaging data 802 that are higher or lower (in excess of defined tolerances) than their corresponding surfaces of the as-designed digital model 322. Inspection result data 902 may also identify improperly angled edges, misplaced or misoriented features (e.g., holes, pockets, etc.), or other such deviations from the prescribed part geometry.

Returning to FIG. 4, if the inspection component 310 determines, based on the comparison performed at step 8, that the manufactured part is in tolerance and therefore passes inspection, the machining process ends for the current part under production (unless further machining within the work cell is necessary in order to complete the part). Depending on the application, the finished part may be sent to a downstream workstation for further processing or assembly or may be removed by an operator and placed in finished part inventory.

Alternatively, if the comparison at step 8 determines that the manufactured part is not in tolerance, the process flow proceeds to step 9 (M-Simulate Tool Pathing). During this step, the inspection result data 902 is fed back to the tool path generation component 304, as illustrated in FIG. 9. Tool path generation component 304 analyzes the inspection result data 902 quantitatively to determine whether modifications can be made to the previously executed tooling path instructions $508_1$ for a subsequent machining cycle in order to bring the part geometry into tolerance, and if so, appropriately modifies the previous tooling path instructions $508_1$ based on the inspection result data 902 to yield modified tooling path instructions $508_2$. For example, if the inspection result data 902 indicates that a first surface of the part is 0.005 inches too high (heavy) and a second surface of the part is 0.007 inches too low (light), the tool path generation component 304 may modify the previous tooling path instructions $508_1$ to increase the depth of cut of the first surface by 0.005 inches and to decrease the depth of cut of the second surface by 0.007 inches to compensate. In some embodiments, rather than modifying the previously executed tooling path instructions $508_1$, tool path generation component 304 may calculate a new corrective tooling path based on the inspection result data 902 designed to correct the detected defect, and generate appropriate tooling path instructions for carrying out this corrective tooling path.

In some embodiments, user interface component 312 can render the proposed tooling path modifications on a display device or client device and prompt an operator to approve the proposed tool path modifications before proceeding with the subsequent machining operation. The user interface component 312 can also allow the user to override or adjust one or more of the proposed tooling path modifications during this step in some embodiments.

Also, similar to step 2 of the process flow, some embodiments of tool path generation component 304 can generate the modified tooling path instructions $508_2$ using simulation techniques. In some such embodiments, tool path generation component 304 may iteratively simulate execution of the modified tooling path instructions $508_2$ on an emulated part represented by corrected 3D imaging data 802, and converge on suitable modified tooling path instructions $508_2$ (or new corrective tooling path instructions) estimated to correct the deviations reported by the inspection result data 902.

In some embodiments, the modified tooling path instructions $508_2$ may take into consideration the current shape of the part (that is, the shape of the part upon completed execution of the previous tooling path instructions $508_1$). For example, if the only deviation discovered by the inspection component 310 is a portion of a surface that is too high, the tool path generation component 304 may design a tooling path that deepens the depth of cut for this surface while omitting other machining operations that were previously performed, and generate modified tooling path instructions $508_2$ to reflect this abbreviated tool path.

Also, some embodiments of tool path generation component 304 can be configured to consider other properties of the provisional manufactured part when calculating optimal modified tooling path instructions $508_2$ for correcting the part. For example, it may be known that, if the temperature of the part is above a specified temperature, certain dimensions of the part are likely to be distorted due to thermal expansion and will likely converge closer to, or within, the design tolerances after the part cools. Accordingly, the manufacturing control system 302 may collect thermal measurements from the part as part of the measurement stage and provide this thermal data to the tool path generation component 304. If the thermal data suggests that the part is likely to be experiencing thermal expansion, tool path generation component 304 can adjust the inspection result data 902 based on a prediction of how the tolerance deviations are likely to change when the part has cooled, and generate the modified tooling path instructions $508_2$ based on this modified inspection result data 902. In this way, the reworking of the part to correct deviations from as-designed tolerances takes into consideration expected contraction of the part after manufacturing is complete. In some cases, if the tool path generation component 304 predicts that subsequent contraction of the part after cooling will bring all detected geometric deviations within defined tolerances, the system 302 may omit further re-working of the part.

The modified tooling path instructions $508_2$ are sent to the tool drive system 502, and a second machining cycle is performed on the machined part in accordance with the new instructions $508_2$. This is represented in FIG. 4 by a return to step 4 from step 9 of the process flow. Steps 4-8 are then repeated, such that the tool drive system 502 executes the modified tooling path instructions $508_2$ to perform the modified machining operation (step 4), the metrology sensor scans the re-machined part using the same inspection path instructions 510 (step 5), and the resulting measured inspection data 704 is processed and corrected (steps 6 and 7). The re-machined part is again inspected at step 8 to determine whether further machining cycles are necessary to bring the part into tolerance. If necessary, manufacturing control system 302 can perform multiple iterations of steps 4-9 until the inspection component 310 determines at step 8 that the geometry of the machined part is within defined tolerances of the as-designed digital model 322, or that the machined part cannot be brought into tolerance given the nature of the defects and the limitations of the tool's work envelope (as defined by the motion parameters 512). If the inspection component 310 determines, based on the nature or degree of the deviations and the limitations of the motion parameters 512 of the machining tool, that further machining cannot bring the part under production within defined tolerances, the user interface component 312 can render a suitable message indicating that the machining operation has failed and that the part should be removed.

The foregoing examples have assumed that a complete machining cycle—comprising one or more passes of the machining tool—is executed at step 4 of the process flow, such that the first execution of step 4 may yield an acceptable completed part if the part passes inspection at step 8. In some embodiments in which multiple machining passes or stages are required to form the completed part, image capture and inspection steps 5-8 can be performed upon completion of each individual machine pass to determine whether the next planned machine pass should be modified to account for a discovered defect early in the machining process. In such embodiments, inspection result data 902 collected for tool passes prior to the final pass represents interim inspection data that can be used to dynamically compensate for detected defects during the machining cycle.

Pursuant to a specific example, a CNC machine may be designed to shape a unit of stock material into a fan blade. A designer may use CAD software to develop a 3D digital CAD model of the fan blade (step 1), which is imported into the manufacturing control system 302 (e.g., using user interface component 312) and stored as as-designed digital model 322. This digital model 322 of the fan blade is used to generate tooling path instructions 508 (e.g., as g-code or another type of machining programming code) for converting the unit of stock material into a fan blade that conforms to the design specifications defined by the digital model 322 (step 2). In some embodiments, the tooling path instructions 508 may be at least partially generated by the tool path generation component 304 based on analysis of the digital model 322 and knowledge of the machining tool's range of motion (as defined by tool motion parameters 512, which define the tool's limits of travel). Some or all of the initial tooling path instructions 508 may also be manually programmed (or modified) by the machine tool programmer using computer-aided manufacturing (CAM) software. In this example, the machining sequence involves performing one or more passes of the machining tool to make one or more rough cuts in the stock material, followed by a final pass to perform a final cut.

The machine tool programmer can also use the same software to plan and develop inspection path instructions 510 defining a scan path for a metrology sensor (e.g., a laser measurement device) intended to measure critical geometric features of the machined part for inspection purposes (step 3). As with the tooling path instructions 508, these inspection path instructions 510 can be at least partially generated, in some embodiments, by the sensor path generation component 306 based on the digital model 322 and the sensor's motion parameters 512 (which may be the same as the tool's motion parameters 512 if the metrology sensor is attached to the spindle or operating arm of as the machining tool).

In the machining work envelope, a first rough cut is made on the unit of stock material in accordance with the tooling path instructions 508 (step 4). In conventional CNC manufacturing, another rough cut or a final cut would be made by the machining tool at this point. Instead, in accordance with the morphic manufacturing process flow described above, the inspection path instructions 510 are executed, causing the metrology sensor to capture a 3D image of the in-process workpiece (step 5). This image is processed to compensate for sensor calibration and to align the coordinate system of the 3D image with that of the digital model 322 (step 6). The processed image is further processed to correct image defects (e.g., degenerate facets, folded edges, self-intersections, inconsistent normal, or laminar slits) (step 7). The resulting processed image data is then compared to the as-designed digital model 322 (step 8).

In the present fan blade example, it is determined based on this comparison that a first surface (surface A) is 0.005 inches too high (heavy) and that a second surface (surface B) is 0.005 inches too low (light) upon completion of the initial rough cut. Accordingly, the manufacturing control system 302 adjusts the tooling path instructions 508 for the next cut to increase the depth of cut of surface A by 0.005 inches and to decrease the depth of cut of surface B by an equal amount (step 9). The system then continues with a subsequent machining pass (step 4) and the process is repeated until the machined fan blade is found to conform to the design parameters encoded in the digital model 322.

Some embodiments can also be configured to perform a preliminary inspection cycle of the stock material before initiating the main machining sequence. Such embodiments can be useful in some machining applications in which the initial units of stock material are geometrically inconsistent, as in the case of metal castings that may arrive at the machining work cell with unexpected high or low spots (e.g., burrs, pits, etc.) as artifacts of the casting process. In some cases, such defects or imperfections in the stock material may propagate to the finished part, or may necessitate a slower and more conservative machining operation to account or unexpected high or low spots in the material.

To address this issue, one or more embodiments described herein can execute a preliminary sensor scan of the stock material prior to executing the main tooling path instructions. In such embodiments, the system 302 may generate both primary inspection path instructions 510 designed to inspect the final machined part (as described above), as well as preliminary inspection path instruction designed to inspect the unit of stock material prior to performing this primary machining. Prior to execution of steps 4 and 5 of the process flow, sequencing component 314 can initiate execution of the preliminary inspection path instructions, causing the sensor tool to traverse a sensor path over the stock material within the work cell and collect measurement data (e.g., 3D image data, point cloud data, etc.) representing the surfaces of the stock material. This measurement data is processed by the measurement processing component 308 to correct image defects and compensate for sensor calibration, and the resulting corrected 3D imaging data is analyzed by the inspection component 310 to identify irregularities—e.g., high spots or low spots—in the surface geometry of the stock material. This inspection can be based on comparison with an idealized digital model of a unit of stock material, or by performing another type of analysis designed to identify geometric irregularities.

If the inspection component 310 identifies irregularities in the stock material, the tool path generation component 304 can formulate, based on the inspection results, a tooling operation estimated to correct the irregularity (e.g., by removing high spots or filling in low spots), and generate a set of preliminary tooling path instructions for implementing the tooling operation. The tool drive system 502 then executes these preliminary tooling path instructions to facilitate correction of the defects. In some embodiments, a subsequent preliminary inspection can be performed on the corrected unit of stock material to determine whether the irregularities have been corrected, and a second preliminary tooling sequence can be carried out if further work is necessary to remove the irregularities. Alternatively, the system may be configured to perform only one preliminary inspection and (if necessary) tooling sequence before proceeding to the primary tooling sequence. In either case, the system 302 will proceed to the primary tooling sequence (e.g., the process flow depicted in FIG. 4) after preliminary inspection and any necessary preliminary corrections have been performed on the stock material.

In some embodiments, the inspection component 310 can store digital records of the inspection result data 902 for each manufactured part (e.g., in memory 320) for subsequent review or auditing purposes. In most conventional machining applications, in which part inspection is performed off-line, comprehensive inspection of every finished part is not practical given the additional time and labor involved in transferring the finished parts to an inspection area and performing manual inspection scans. Consequently, operators typically only perform comprehensive inspections on a small subset of all machined parts. This leaves a considerable data gap, since comprehensive inspection and measurement data is not collected and stored for most finished parts.

The automated in-process inspections described herein not only improve the quality and consistency of finished parts by feeding real-time inspection results back to the manufacturing process, but also yield comprehensive part-specific measurement and inspection records for each finished part, thereby filling these gaps in the data records. Users can access these records via interaction with user interface component 312, which formats the inspection data for rendering on a monitor or a client device communicatively connected to the manufacturing control system 302 (e.g., a mobile phone or other personal device, a laptop computer, a tablet computer, a desktop computer, etc.). Information contained in the inspection records can include, but is not limited to, metrology measurements captured for the part after each machining pass, a 3D image of the part captured after each machining pass, the total number of passes required to bring the part into tolerance with the digital model 322, a part-specific digital representation or model of the part generated based on the as-manufactured geometric or metrology measurements collected for the part, or other such information.

The as-manufactured measurement data collected for each part can also be combined with other as-designed information and/or test data to form a part-specific digital twin of each finished part. These part-specific digital twins can be used in a variety of applications. For example, if the finished part is intended to be mated with one or more other machined parts to yield a larger assembly, the precise geometric or metrology information contained in each digital twin can be leveraged to identify specific sets of finished parts having complementary or compatible geometries or tolerances that are estimated to yield an optimal assembly when mated. A part-specific digital twin can also be integrated into a simulation system that executes simulations of the finished part—or of a machine that includes the finished part—in order to predict behaviors of the part under different operating scenarios. The use of part-specific digital twins in such simulations can improve the accuracy and reliability of simulation results, since the digital twin accounts for as-manufactured idiosyncratic part geometries rather than idealized as-designed geometries. Such simulations may also be integrated into a control system that monitors and controls a machine that incorporates the finished part, such that control outputs to the machine are based on simulations performed on the digital twin using real-world simulation inputs collected from external sensors.

The morphic manufacturing approach described herein can significantly reduce the time and labor involved in inspecting manufactured workpieces. By replacing off-line manual inspections with in situ inspection and feedback processing integrated into the manufacturing process, inspection data is more quickly and reliably provided to the manufacturing process without human error. Automated in-line collection of inspection data for manufactured parts also yields accurate as-manufactured data records for each completed part that can be stored for auditing purposes, or used to generate as-manufactured digital twins for each part.

FIGS. 10A-11B illustrate various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on a computer-readable storage medium to facilitate transporting and transferring such methodologies to computers.

Figure 10A:
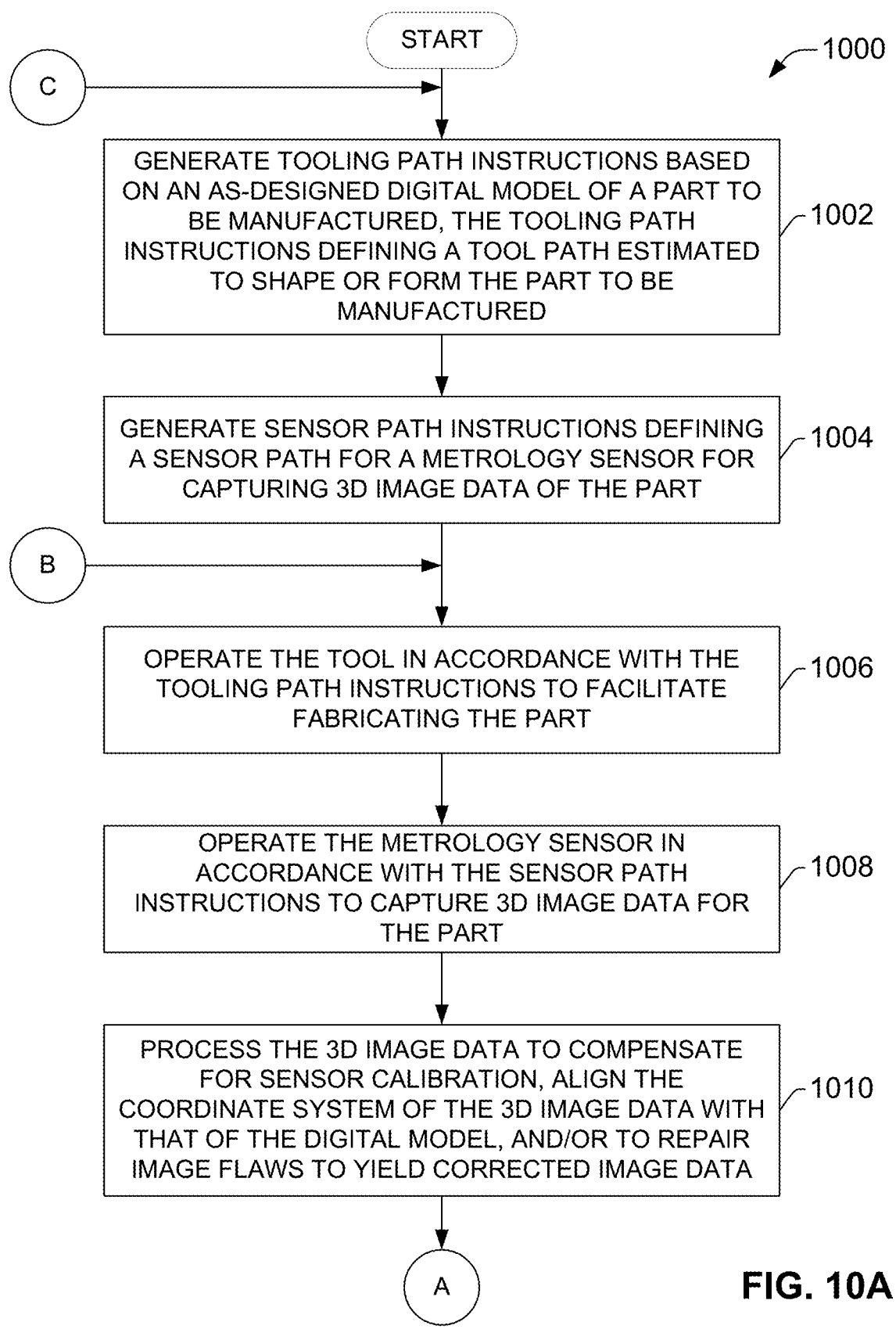
FIGS. 10A-10B are flowcharts of an example methodology for performing in situ inspection of a manufactured part and feeding results of the inspection back to the manufacturing process.

FIG. 10A illustrates a first part of an example methodology 1000 for performing in situ inspection of a manufactured part and feeding results of the inspection back to the manufacturing process. At 1002, tooling path instructions are generated based on an as-designed digital model of a part to be manufactured. The tooling path instructions define a tool path to be traversed by a manufacturing tool (e.g., a tool of a subtractive, additive, or hybrid work cell) that is estimated to shape or form the part to be manufactured (e.g., by shaping a unit of stock material using a subtractive manufacturing process or by depositing material in a controlled manner to form the part using an additive manufacturing process). In some embodiments, the tooling path instructions may be at least partially written manually by a machine programmer. At least some of the tool path instructions may also be generated automatically based on analysis of the digital model of the part and the known motion parameters of the manufacturing tool.

At 1004, sensor path instructions are generated defining a sensor path for a metrology sensor, where the sensor path is designed to capture 3D image data for the part. In some embodiments, the sensor may be attached to the same operating arm or spindle as the manufacturing tool. In such embodiments, the tooling path instructions and sensor path instructions can be executed on the same drive system that controls the operating arm. This configuration can also ensure that the collected sensor data is captured in the same coordinate system as that of the manufacturing process. Alternatively, the sensor may be a fixed sensor within the work cell that does not require a sensor path, in which case step 1004 can be omitted. In yet another implementation, the sensor may be integrated within a separate articulating system (e.g., a measuring robot) that manipulates the sensor to collect measurement data for the part.

At 1006, the tool is operated in accordance with the tooling path instructions generated at step 1002 to facilitate fabricating the part. At 1008, the metrology sensor is operated in accordance with the sensor path instructions generated at step 1004 to capture 3D image data for the resulting part. If the sensor is mounted to the same operating arm as the tool, the operating arm maneuvers the tool at step 1006 to machine or form the part and, upon completion of this tooling step, maneuvers the sensor over the resulting part to collect the 3D image data. If the sensor is a fixed sensor, step 1008 may involve only operating the sensor to collect inspection data from the part without traversing a scan path.

At 1010, the 3D image data collected at step 1008 is processed to compensate for sensor calibration, align the coordinate system of the 3D image data with that of the as-designed digital model, and/or repair flaws in the 3D image to yield corrected image data.

Figure 10B:
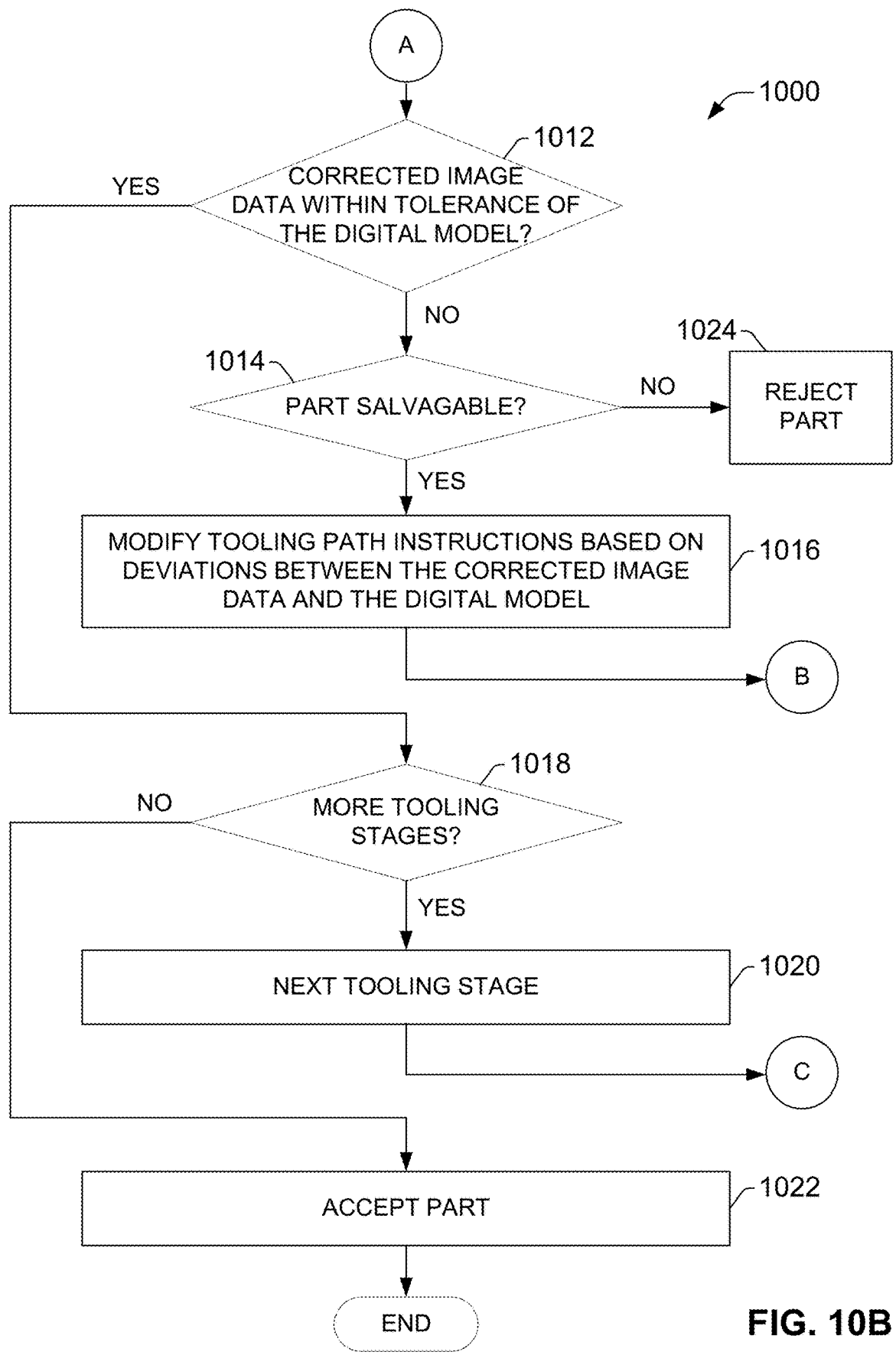

The methodology 1000 continues in FIG. 10B. At 1012, a determination is made as to whether the corrected image obtained at step 1010 is within tolerance of the digital model. In an example embodiment, specific areas or surfaces represented by the corrected image data that deviate (in excess of a defined tolerance) from their corresponding areas or surfaces represented in the as-designed digital model can be identified based on a comparison between the digital model and the corrected image data. If the corrected image data is not within tolerance of the digital model (NO at step 1012), the methodology proceeds to step 1014, where a determination is made as to whether the part is salvageable; that is, whether the part can be corrected with one or more further tooling cycles. If the part is deemed unsalvageable (NO at step 1014), the methodology proceeds to step 1024, where the part is rejected. Alternatively, if the part is deemed salvageable or correctable (YES at step 1014), the methodology proceeds to step 1016, where the tooling path instructions are modified based on detected deviations between the corrected image data and the digital model. For example, if a cut made to the machined part is found to be 0.006 inches shallower than the ideal as-designed depth for the cut defined by the digital model, the tooling path instructions can be modified to increase the cutting depth for the corresponding portion of the tool path by 0.006 inches. In some embodiments, rather than modifying the previously executed tooling path, a new corrective tooling path may be generated based on the deviations detected at step 1012. This new corrective tooling path may specifically target the detected deviation while omitting other portions of the tooling path that have already been completed correctly.

After the tooling path instructions have been modified at step 1016, the methodology returns to step 1006, and steps 1006-1012 are repeated using the updated tooling path instructions. Steps 1006-1016 can be repeated as necessary until the corrected image data is found to be within tolerance of the digital model at step 1012 (YES at step 1012).

When the corrected image data is found to be within tolerance of the digital model (YES at step 1012), the methodology proceeds to step 1018, where a determination is made as to whether more tooling stages are necessary to complete the part. This may be the case if multiple tooling stages are to be performed on the part before the part leaves the work cell, and each stage is to be inspected and corrected before proceeding to the next stage. If more tooling stages are necessary (YES at step 1018), the next tooling stage is selected at step 1020, and the methodology returns to step 1002. Steps 1002-1018 are repeated for each stage of the tooling process until all required tooling stages have been completed (note that some manufacturing applications may only require one tooling stage). When all tooling stages have been completed (NO at step 1018), the part is accepted at step 1022 and the methodology ends.

Figure 11A:
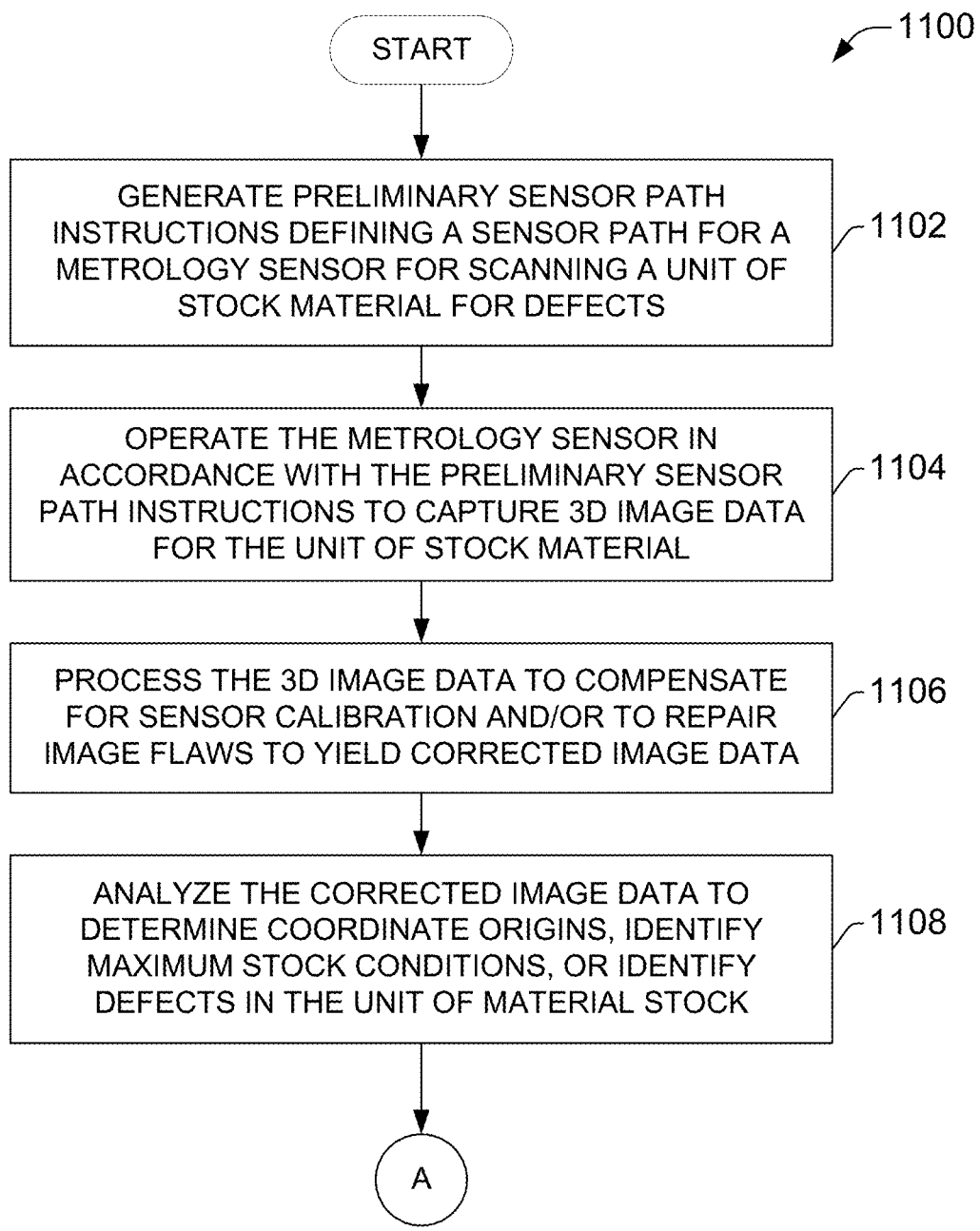
FIGS. 11A-11B are flowcharts of an example methodology for performing a preliminary in situ inspection on a piece of stock material to be machined within an additive, subtractive, or hybrid machining work cell.

FIG. 11A illustrates a first part of an example methodology 1100 for performing a preliminary in situ inspection on a piece of stock material to be machined within a subtractive or hybrid machining work cell. In some embodiments methodology 1100 can be performed as a preliminary sequence prior to performing the primary tooling and inspection methodology 1000 depicted in FIGS. 10A-10B. At 1102, preliminary sensor path instructions are generated that define a sensor path for a metrology sensor for scanning and measuring a unit of stock material for defects. The sensor path is designed to collect these measurements while the unit of stock material is in place within the machining work cell. At 1104, the metrology sensor is operated in accordance with the preliminary sensor path instructions generated at step 1102 to capture 3D image data for the unit of stock material. At 1106, the 3D image data is processed to compensate for sensor calibration and/or to repair imaging flaws to yield corrected image data.

At 1108, the corrected image data is analyzed to determine coordinate origins, to identify maximum stock conditions, or to identify defects in the unit of stock material. In the case of defect detection, this analysis may entail comparing the corrected image data with an idealized digital model of the unit of stock material and identifying defects or inconsistencies (e.g., raised areas such as burrs or other artifacts, low areas, excessive pitting, etc.) in the actual material based on the comparison. In other embodiments, other types of analysis can be performed on the corrected image data to identify inconsistencies and defects.

Figure 11B:
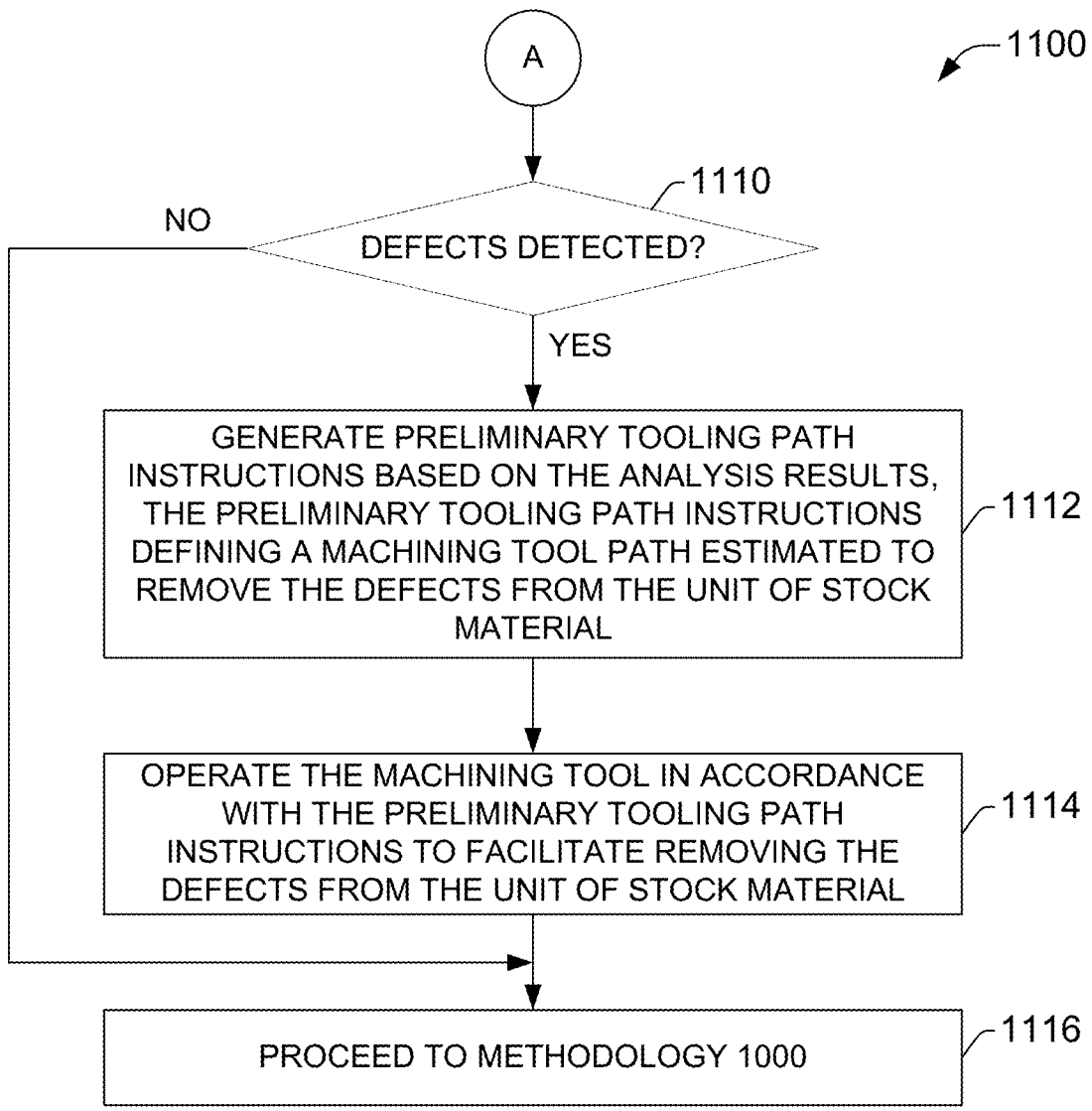

The methodology 1100 continues in FIG. 11B. At 1110, a determination is made as to whether defects in the stock material are detected based on results of the analysis performed at step 1108. If defects are detected (YES at step 1110), the methodology proceeds to step 1112, where preliminary tooling path instructions are generated based on the analysis results. The preliminary tooling path instructions define a machining tool path estimated to remove the detected defects from the unit of stock material via subtractive or hybrid machining of the stock material. At 1114, the machining tool is operated in accordance with the preliminary tooling path instructions to facilitate removing the defects from the unit of stock material via additive and/or subtractive machining. At 1116, methodology 1000 (described above in connection with FIGS. 10A-10B) is initiated. If the analysis performed at step 1108 finds no defects in the stock material (NO at step 1110), steps 1112 and 1114 are skipped and methodology 1000 is initiated without performing preliminary tooling on the stock material.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments of the machining control system described herein can be implemented in any computer system or environment having any number of memory or storage units (e.g., memory 320 of FIG. 3), and any number of applications and processes occurring across any number of storage units. This includes, but is not limited to, an environment with server computers and client computers deployed in a network environment or a distributed computing environment, having remote or local storage. For example, with reference to FIG. 3, the tool path generation component 304, sensor path generation component 306, measurement processing component 308, inspection component 310, user interface component 312, and sequencing component 314 can be stored on a single memory 320 associated with a single device, or can be distributed among multiple memories associated with respective multiple devices. Similarly, tool path generation component 304, sensor path generation component 306, measurement processing component 308, inspection component 310, user interface component 312, and sequencing component 314 can be executed by a single processor 318, or by multiple distributed processors associated with multiple devices.

Distributed computing provides sharing of computer resources and services by communicative exchange among computing devices and systems. These resources and services include the exchange of information, cache storage and disk storage for objects. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 12:
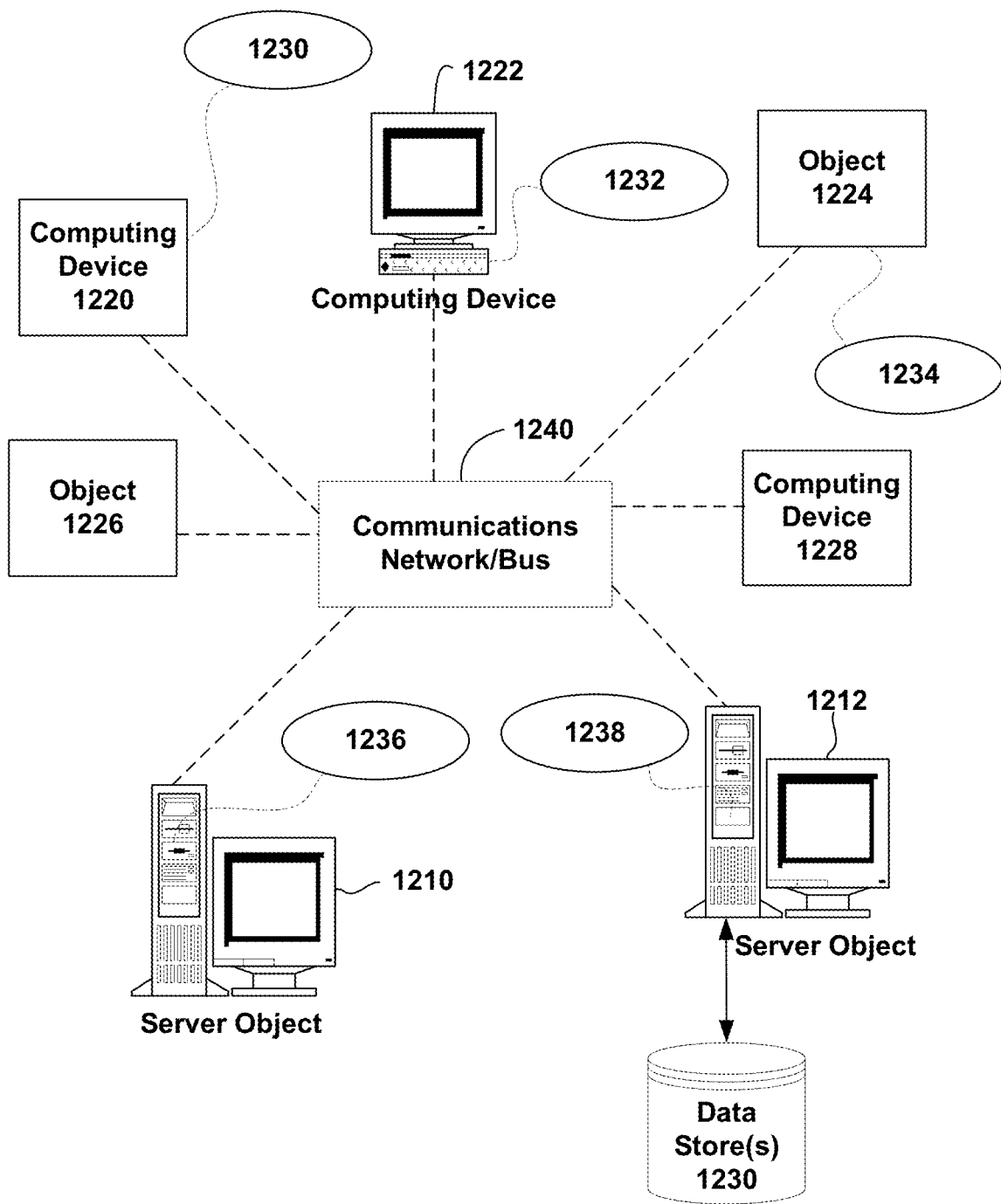
FIG. 12 is a block diagram representing an exemplary networked or distributed computing environment for implementing one or more embodiments described herein.

FIG. 12 provides a schematic diagram of an exemplary networked or distributed computing environment. The distributed computing environment includes computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238. It can be appreciated that computing objects 1210, 1212, etc. and computing objects or devices 1220, 1222, 1224, 1226, 1228, etc. may comprise different devices, such as personal digital assistants (PDAs), audio/video devices, mobile phones, MP3 players, personal computers, laptops, tablets, etc., where embodiments of the design system described herein may reside on or interact with such devices.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1240, either directly or indirectly. Even though illustrated as a single element in FIG. 12, communications network 1240 may comprise other computing objects and computing devices that provide services to the system of FIG. 12, and/or may represent multiple interconnected networks, which are not shown. Each computing object 1210, 1212, etc. or computing objects or devices 1220, 1222, 1224, 1226, 1228, etc. can also contain an application, such as applications 1230, 1232, 1234, 1236, 1238 (e.g., manufacturing control system 302 or components thereof), that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc. provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1240 is the Internet, for example, the computing objects 1210, 1212, etc. can be Web servers, file servers, media servers, etc. with which the client computing objects or devices 1220, 1222, 1224, 1226, 1228, etc. communicate via any of a number of known protocols, such as the hypertext transfer protocol (HTTP). Computing objects 1210, 1212, etc. may also serve as client computing objects or devices 1220, 1222, 1224, 1226, 1228, etc., as may be characteristic of a distributed computing environment.

Exemplary Computing Device

Figure 13:
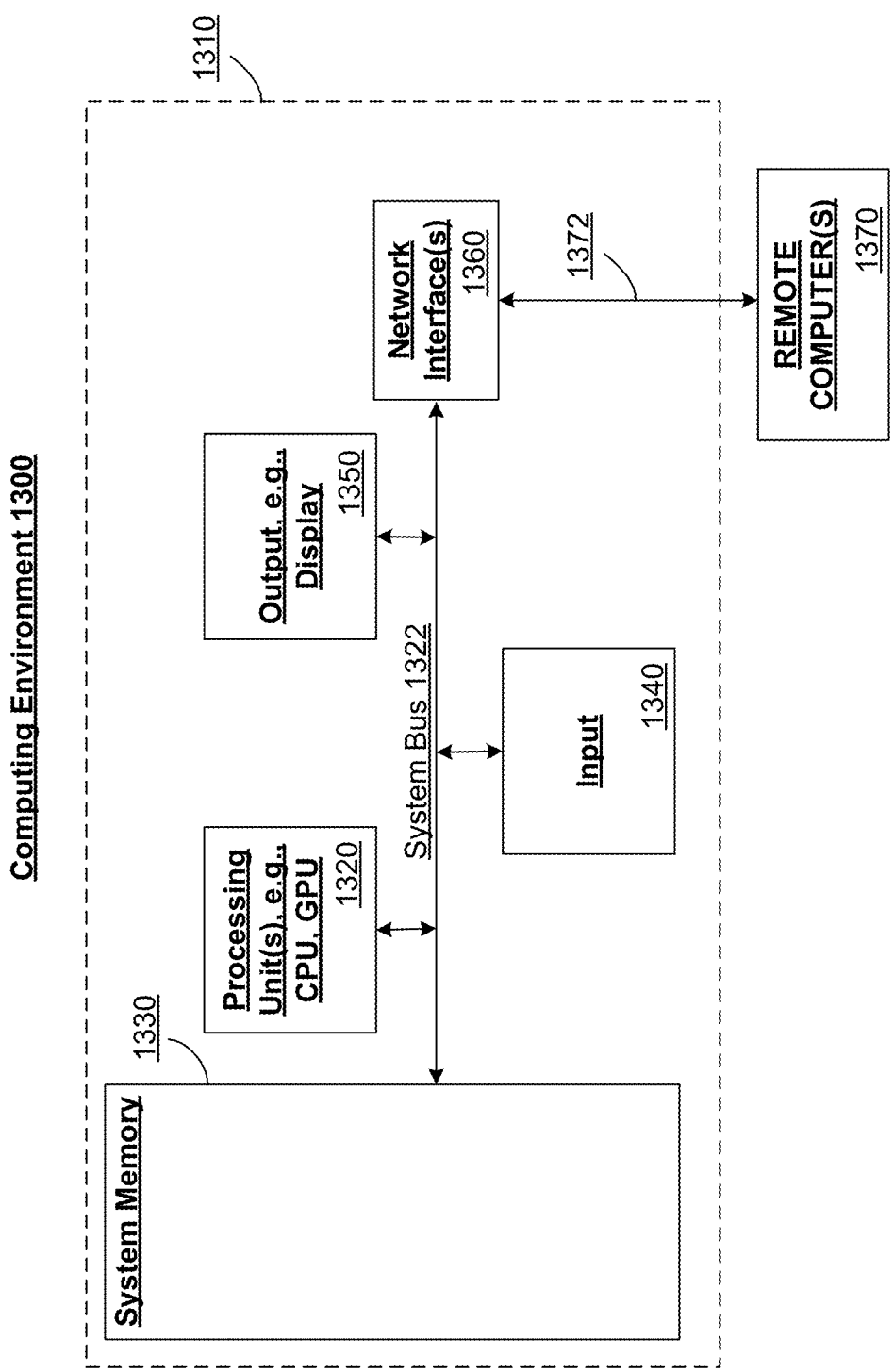
FIG. 13 is a block diagram representing an exemplary computing system or operating environment for implementing one or more embodiments described herein.

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 13 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 13 thus illustrates an example of a suitable computing system environment 1300 in which one or aspects of the embodiments described herein can be implemented, although as made clear above, the computing system environment 1300 is only one example of a suitable computing environment and is not intended to suggest any limitation as to scope of use or functionality. Neither is the computing system environment 1300 be interpreted as having any dependency or requirement relating to any one or combination of components illustrated in the exemplary computing system environment 1300.

With reference to FIG. 13, an exemplary computing device for implementing one or more embodiments in the form of a computer 1310 is depicted. Components of computer 1310 may include, but are not limited to, a processing unit 1320, a system memory 1330, and a system bus 1322 that couples various system components including the system memory to the processing unit 1320. Processing unit 1320 may, for example, perform functions associated with processor(s) 318 of manufacturing control system 302, while system memory 1330 may perform functions associated with memory 320.

Computer 1310 typically includes a variety of computer readable media and can be any available media that can be accessed by computer 1310. The system memory 1330 may include computer storage media in the form of volatile and/or nonvolatile memory such as read only memory (ROM) and/or random access memory (RAM). By way of example, and not limitation, system memory 1330 may also include an operating system, application programs, other program modules, and program data.

A user can enter commands and information into the computer 1310 through input devices 1340, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1310. A monitor or other type of display device is also connected to the system bus 1322 via an interface, such as output interface 1350. In addition to a monitor, computers can also include other peripheral output devices such as speakers and a printer, which may be connected through output interface 1350. In one or more embodiments, input devices 1340 can provide user input to user interface component 312, while output interface 1350 can receive information relating to operations of the manufacturing control system 302 from user interface component 312.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media (e.g., memory 320) and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the inferences described herein (e.g. in connection with curve fitting operations), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

In view of the exemplary systems described above, methodologies that may be implemented in accordance with the described subject matter will be better appreciated with reference to the flowcharts of the various figures (e.g., FIGS. 10A-11B). While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A manufacturing device that incorporates three-dimensional imaging measurement and dynamic inspection feedback, comprising:
 a sensor that performs inspection;
 a tool for at least one of machining or deposition;
 a memory; and a processor configured to execute components stored on the memory, the components comprising:
  a sequencing component configured to
    initiate execution of tooling path instructions, wherein the execution of the tooling path instructions causes the tool to traverse a defined tooling path estimated to fabricate a part in a work cell using at least one of subtractive or additive tooling in accordance with a digital model of the part, and
    in response to completion of the execution of the tooling path instructions, initiate execution of inspection path instructions, wherein the execution of the inspection path instructions causes a metrology sensor to collect measured inspection data for the part while the part is in the work cell;
  an inspection component configured to determine whether the part is within tolerance of design specifications based on a comparison of the measured inspection data with the digital model of the part; and
  a tool path generation component configured to, in response to a determination by the inspection component that a portion of the part is not within tolerance of the design specifications, generate corrective tooling path instructions based on a difference between the measured inspection data and the digital model,
  wherein
    the sequencing component is further configured to initiate execution of the corrective tooling path instructions in response to the determination that the portion of the part is not within tolerance of the design specifications, and
    the execution of the corrective tooling path instructions causes the tool to traverse a corrective tooling path that corrects the portion of the part and that omits portions of the defined tooling path not related to correction of the portion of the part.

2. The manufacturing device of claim 1, wherein the manufacturing device is a subtractive machining system.

3. The manufacturing device of claim 1, wherein the manufacturing device is an additive machining system.

4. The manufacturing device of claim 1, wherein the manufacturing device is a hybrid machining system.

5. The manufacturing device of claim 1, wherein the inspection component is further configured to compare corrected measurement data with the digital model to determine whether the part satisfies design tolerances, or if the tool requires modification to bring the part into tolerance.

6. The manufacturing device of claim 1, further comprising a measurement processing component configured to perform processing on the measured inspection data prior to comparison with the digital model,
  wherein the processing comprises at least one of processing to compensate for calibration of the sensor, alignment of a first coordinate system of the measured inspection data with a second coordinate system of the digital model, or processing to correct imaging defects in the measured inspection data.

7. The manufacturing device of claim 1, wherein
  the tool and the metrology sensor are attached to a same operating arm, and
  the execution of the inspection path instructions causes the metrology sensor to traverse a scan path over the part to facilitate collection of the measured inspection data.

8. The manufacturing device of claim 7, wherein the measured inspection data is registered in a same coordinate system as the digital model.

9. The manufacturing device of claim 1, wherein the measured inspection data comprises three-dimensional imaging data representing the part.

10. The manufacturing device of claim 1, wherein the sequencing component is further configured to initiate execution of preliminary inspection path instructions that cause the metrology sensor to collect preliminary inspection data for a piece of machine stock to be machined by the tool prior to execution of the tooling path instructions.

11. The manufacturing device of claim 10, wherein
  the inspection component is further configured to identify one or more surface defects in the piece of machine stock based on analysis of the preliminary inspection data,
  the tool path generation component is further configured to generate preliminary tooling path instructions designed to eliminate the one or more surface defects, and
  the sequencing component is configured to initiate execution of the preliminary tooling path instructions prior to initiating execution of the tooling path instructions.

12. The manufacturing device of claim 1, wherein the tool path generation component is configured to generate at least one of the tooling path instructions or the corrective tooling path instructions based on a simulation performed on the digital model of the part.

13. The manufacturing device of claim 1, wherein the inspection component is configured to store record data in association with the part, the record comprising at least one of the measured inspection data, a result of the comparison of the measured inspection data with the digital model of the part, a number of executions of corrective tooling path instructions that were performed to bring the part into tolerance with the digital model, a three dimensional image of the part collected by the metrology sensor, or a digital twin of the part generated based in part on the measured inspection data.

14. The manufacturing device of claim 1, wherein the metrology sensor is at least one of a touch probe, a laser-based or ultrasound-based distance measurement device, an optical sensor, a surface flaw detector, a contact dimensional instrument, or an alloy analyzer.

15. A CNC machine that incorporates three-dimensional imaging measurement and dynamic inspection feedback, comprising:
  a sensor that performs inspection;
  a tool for machining;
  a memory; and
  a processor configured to execute components stored on the memory, the components comprising:
    a sequencing component configured to
      initiate execution of tooling path instructions, wherein the execution of the tooling path instructions causes the tool to traverse a defined tooling path estimated to fabricate a part in a work cell using at least one of subtractive or additive tooling in accordance with a digital model of the part, and
      in response to completion of the execution of the tooling path instructions, initiate execution of inspection path instructions, wherein the execution of the inspection path instructions causes a metrology sensor to collect measured inspection data for the part while the part is in the work cell;

an inspection component configured to determine whether the part is within tolerance of design specifications based on a comparison of the measured inspection data with the digital model of the part; and a tool path generation component configured to, in response to a determination by the inspection component that an area of the part is not within tolerance of the design specifications, generate corrective tooling path instructions based on a difference between the measured inspection data and the digital model, wherein the sequencing component is further configured to initiate execution of the corrective tooling path instructions in response to the determination that the area of the part is not within tolerance of the design specifications, and the execution of the corrective tooling path instructions causes the tool to traverse a corrective tooling path that targets correction of the area of the part and that omits portions of the defined tooling path not related to the correction of the area of the part.

16. The CNC machine of claim 15, wherein the inspection component is further configured to compare corrected measurement data with the digital model to determine whether the part satisfies design tolerances, or if the tool requires modification to bring the part into tolerance.

17. The CNC machine of claim 15, wherein the tool and the sensor are attached to a same operating arm, and the execution of the inspection path instructions causes the sensor to traverse a scan path over the part to facilitate collection of the measured inspection data.

18. The CNC machine of claim 15, wherein the sequencing component is further configured to initiate execution of preliminary inspection path instructions that cause the sensor to collect preliminary inspection data for a piece of machine stock to be machined by the tool prior to execution of the tooling path instructions.

19. The CNC machine of claim 18, wherein the inspection component is further configured to identify one or more surface defects in the piece of machine stock based on analysis of the preliminary inspection data, the tool path generation component is further configured to generate preliminary tooling path instructions designed to eliminate the one or more surface defects, and the sequencing component is configured to initiate execution of the preliminary tooling path instructions prior to initiating execution of the tooling path instructions.

20. A three-dimensional printer that incorporates three-dimensional imaging measurement and dynamic inspection feedback, comprising:

a sensor that performs inspection;
a tool for deposition;
a memory; and
a processor configured to execute components stored on the memory, the components comprising:
a sequencing component configured to
initiate execution of tooling path instructions, wherein the execution of the tooling path instructions causes the tool to traverse a defined tooling path estimated to fabricate a part in a work cell using at least one of subtractive or additive tooling in accordance with a digital model of the part, and in response to completion of the execution of the tooling path instructions, initiate execution of inspection path instructions, wherein the execution of the inspection path instructions causes the sensor to collect measured inspection data for the part while the part is in the work cell, an inspection component configured to determine whether the part is within tolerance of design specifications based on a comparison of the measured inspection data with the digital model of the part; and a tool path generation component configured to, in response to a determination by the inspection component that a section of the part is not within tolerance of the design specifications, generate corrective tooling path instructions based on a difference between the measured inspection data and the digital model, wherein the sequencing component is further configured to initiate execution of the corrective tooling path instructions in response to the determination that the section of the part is not within tolerance of the design specifications, and the execution of the corrective tooling path instructions causes the tool to traverse a corrective tooling path that corrects the section of the part and that omits portions of the defined tooling path not related to correction of the section of the part.

21. The three-dimensional printer of claim 20, wherein the inspection component is further configured to compare corrected measurement data with the digital model to determine whether the part satisfies design tolerances, or if the tool requires modification to bring the part into tolerance.

22. The three-dimensional printer of claim 20, further comprising a measurement processing component configured to perform processing on the measured inspection data prior to comparison with the digital model, wherein the processing comprises at least one of processing to compensate for calibration of the sensor, alignment of a first coordinate system of the measured inspection data with a second coordinate system of the digital model, or processing to correct imaging defects in the measured inspection data.

23. The three-dimensional printer of claim 20, wherein the tool and the sensor are attached to a same operating arm, and the execution of the inspection path instructions causes the metrology sensor to traverse a scan path over the part to facilitate collection of the measured inspection data.

24. The three-dimensional printer of claim 20, wherein the sequencing component is further configured to initiate execution of preliminary inspection path instructions that cause the metrology sensor to collect preliminary inspection data for a piece of machine stock to be machined by the tool prior to execution of the tooling path instructions.

25. The three-dimensional printer of claim 24, wherein the inspection component is further configured to identify one or more surface defects in the piece of machine stock based on analysis of the preliminary inspection data, the tool path generation component is further configured to generate preliminary tooling path instructions designed to eliminate the one or more surface defects, and the sequencing component is configured to initiate execution of the preliminary tooling path instructions prior to initiating execution of the tooling path instructions.

* * * * *